United States Patent
Uchimura et al.

(10) Patent No.: US 10,770,939 B1
(45) Date of Patent: Sep. 8, 2020

(54) ROTOR FOR PERMANENT MAGNET ROTARY ELECTRIC MACHINE AND PERMANENT MAGNET ROTARY ELECTRIC MACHINE

(71) Applicant: MITSUBISHI ELECTRIC CORPORATION, Chiyoda-ku (JP)

(72) Inventors: Tomoya Uchimura, Chiyoda-ku (JP); Shinichi Yamaguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 16/303,780

(22) PCT Filed: Mar. 27, 2017

(86) PCT No.: PCT/JP2017/012308
§ 371 (c)(1),
(2) Date: Nov. 21, 2018

(87) PCT Pub. No.: WO2017/221496
PCT Pub. Date: Dec. 28, 2017

(30) Foreign Application Priority Data

Jun. 24, 2016 (JP) .................. 2016-125359

(51) Int. Cl.
*H02K 1/27* (2006.01)
*H02K 21/14* (2006.01)
*H02K 29/03* (2006.01)

(52) U.S. Cl.
CPC ............. *H02K 1/278* (2013.01); *H02K 21/14* (2013.01); *H02K 29/03* (2013.01); *H02K 2201/06* (2013.01)

(58) Field of Classification Search
CPC ........... H02K 1/27; H02K 21/04; H02K 29/03
(Continued)

(56) References Cited

U.S. PATENT DOCUMENTS

| 4,642,502 A * | 2/1987 | Carpenter | H02K 1/278 310/156.12 |
| 5,148,090 A * | 9/1992 | Oku | H02K 19/103 310/106 |
| 2015/0244217 A1 | 8/2015 | Shimamori | |

FOREIGN PATENT DOCUMENTS

| JP | 3-86752 | 9/1991 |
| JP | 7-75321 A | 3/1995 |

(Continued)

OTHER PUBLICATIONS

German Office Action dated Dec. 20, 2019 in Patent Application No. 11 2017 003 124.9 (with English translation), citing documents AO-AR therein; 12 pages.

(Continued)

Primary Examiner — Jose A Gonzalez Quinones
(74) Attorney, Agent, or Firm — Xsensus LLP

(57) ABSTRACT

Provided is a rotor for a permanent magnet rotary electric machine, which enables the bonding of a permanent magnet to a rotor core in a skewed manner with respect to an axial direction of the rotor core. The rotor includes a rotor core including a cylindrical portion and a pair of polygonal columnar portions provided to both ends of the cylindrical portion in the axial direction, and a permanent magnet having a bonding surface, which is flat and bonded to the rotor core. The pair of polygonal columnar portions has flat surfaces that are arranged so that center positions are spaced apart from each other as viewed in the axial direction. The bonding surface of the permanent magnet is bonded to the respective flat surfaces of the pair of polygonal columnar portions under a state in which the permanent magnet is skewed with respect to the axial direction.

10 Claims, 18 Drawing Sheets

(58) Field of Classification Search
USPC ............ 310/156.01, 156.47, 156.68, 216.03
See application file for complete search history.

(56) References Cited

FOREIGN PATENT DOCUMENTS

| | | | | |
|---|---|---|---|---|
| JP | 07075321 A | * | 3/1995 | |
| JP | 2004072858 A | * | 3/2004 | |
| JP | 2005-20930 A | | 1/2005 | |
| JP | 2008-295179 A | | 12/2008 | |
| JP | 2009213283 A | * | 9/2009 | |
| JP | 2009-261191 A | | 11/2009 | |
| JP | 2013-5659 A | | 1/2013 | |
| JP | 2014003795 A | * | 1/2014 | |
| JP | 2015-159639 A | | 9/2015 | |
| WO | WO-2017199470 A1 | * | 11/2017 | ............... H02K 1/27 |

OTHER PUBLICATIONS

International Search Report dated Jun. 20, 2017 in PCT/JP2017/012308 filed Mar. 27, 2017.

\* cited by examiner

ROTOR FOR PERMANENT MAGNET ROTARY ELECTRIC MACHINE AND PERMANENT MAGNET ROTARY ELECTRIC MACHINE

TECHNICAL FIELD

The present invention relates to a rotor for a permanent magnet rotary electric machine, which includes a permanent magnet, and to a permanent magnet rotary electric machine.

BACKGROUND ART

Hitherto, in order to manufacture a surface magnet rotary electric machine at low cost, a combination of a rotor core having a perfectly circular cross section and a plate-shaped permanent magnet having a flat bonding surface has been used. It is difficult to bond the permanent magnet having the flat bonding surface to an outer peripheral surface of the rotor core having the perfectly circular cross section with highly accurate positioning of the permanent magnet. Therefore, retaining portions each having a polygonal columnar shape are provided to ends of the rotor core in an axial direction of the rotor core (see, for example, Patent Literature 1).

CITATION LIST

Patent Literature

[PTL 1] Japanese Patent Application Laid-open No. 2015-159639
[PTL 2] Japanese Utility Model Application Laid-open No. Hei 03-086752
[PTL 3] Japanese Patent Application Laid-open No. 2009-261191

SUMMARY OF INVENTION

Technical Problem

In order to suppress a torque pulsation called "cogging torque" that is generated by an interaction between the permanent magnet of a rotor and a stator core, it is conceivable to bond the permanent magnet of the rotor to the rotor core under a state in which the permanent magnet is skewed with respect to an axial direction of the rotor, to thereby achieve the rotor for a permanent magnet rotary electric machine, which has a skew structure. However, the retaining portions provided to the ends of the rotor core in the axial direction retain both ends of the permanent magnet in a circumferential direction of the rotor with projections extending in the axial direction. Therefore, there is a problem in that the permanent magnet cannot be bonded to the rotor core under the state in which the permanent magnet is skewed with respect to the axial direction.

The present invention has been made to solve the problem described above, and has an object to provide a rotor for a permanent magnet rotary electric machine and a permanent magnet rotary electric machine, which enable bonding of a permanent magnet to a rotor core with highly accurate positioning of the permanent magnet and enable the bonding of the permanent magnet to the rotor core under a state in which the permanent magnet is skewed with respect to an axial direction of the rotor.

Solution to Problem

According to one embodiment of the present invention, there is provided a rotor for a permanent magnet rotary electric machine, including: a rotor core including a cylindrical portion and a pair of polygonal columnar portions provided to both ends of the cylindrical portion in an axial direction of the rotor core; and a permanent magnet having a bonding surface, which is flat and to be bonded to the rotor core, wherein a first polygonal columnar portion which is one of the pair of polygonal columnar portions and a second polygonal columnar portion which is another one of the pair of polygonal columnar portions have flat surfaces, wherein a centroid in a circumferential direction of the cylindrical portion on the flat surface of the first polygonal columnar portion is spaced apart from a centroid in the circumferential direction on the flat surface of the second polygonal columnar portion in the circumferential direction, and wherein the bonding surface of the permanent magnet is bonded to the flat surface of the first polygonal columnar portion and the flat surface of the second polygonal columnar portion under a state in which the permanent magnet is skewed with respect to the axial direction.

Advantageous Effects of Invention

According to the one embodiment of the present invention, the rotor for a permanent magnet rotary electric machine includes: the rotor core including the cylindrical portion and the pair of polygonal columnar portions provided to the both ends of the cylindrical portion in the axial direction of the rotor core; and the permanent magnet having the bonding surface, which is flat and to be bonded to the rotor core. The first polygonal columnar portion which is one of the pair of polygonal columnar portions and the second polygonal columnar portion which is another one of the pair of polygonal columnar portions have the flat surfaces. The centroid in the circumferential direction of the cylindrical portion on the flat surface of the first polygonal columnar portion is spaced apart from the centroid in the circumferential direction on the flat surface of the second polygonal columnar portion in the circumferential direction. The bonding surface of the permanent magnet is bonded to the flat surface of the first polygonal columnar portion and the flat surface of the second polygonal columnar portion under the state in which the permanent magnet is skewed with respect to the axial direction. Therefore, it is possible to achieve bonding of the permanent magnet to the rotor core with highly accurate positioning of the permanent magnet and to achieve the bonding of the permanent magnet to the rotor core under the state in which the permanent magnet is skewed with respect to the axial direction.

DESCRIPTION OF EMBODIMENTS

Hereinafter, preferred embodiments of the present invention are described in detail with reference to the drawings. The embodiments of the present invention are not limited to the embodiments exemplified below.

First Embodiment

Figure 1:
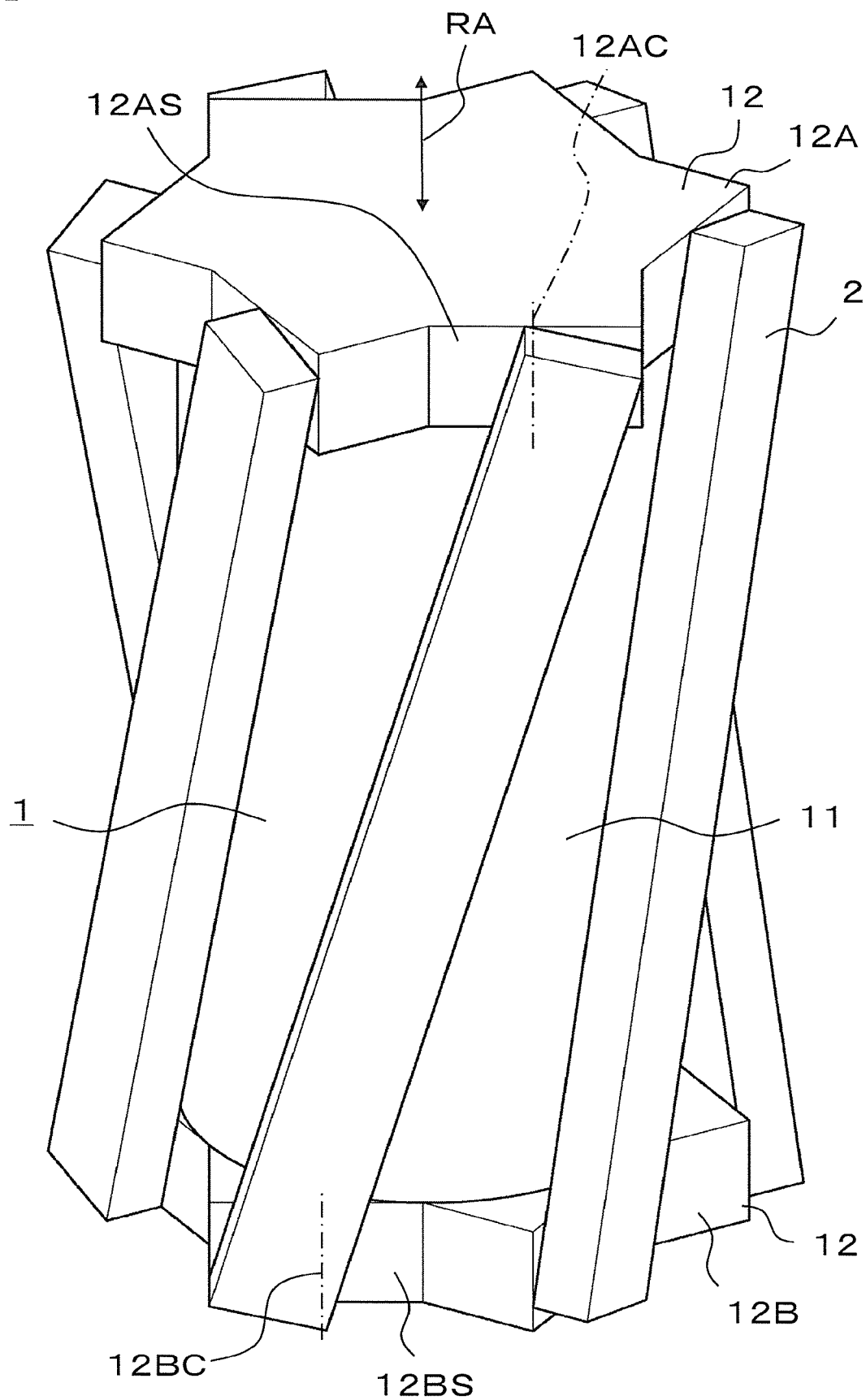
FIG. 1 is a perspective view for illustrating a rotor for a permanent magnet rotary electric machine according to a first embodiment of the present invention.

FIG. 1 is a perspective view for illustrating a rotor for a permanent magnet rotary electric machine according to a first embodiment of the present invention. The rotor for a permanent magnet rotary electric machine according to the first embodiment of the present invention includes a rotor core 1 and a plurality of permanent magnets 2 provided to an outer peripheral portion of the rotor core 1.

First, a configuration of the permanent magnet 2 is described. The permanent magnet 2 has a plate shape with a flat bonding surface. Therefore, the permanent magnet 2 can be manufactured at low cost. Further, the permanent magnet 2 forms a magnetic pole of the rotor. In this rotor, one permanent magnet 2 is provided for one magnetic pole of the rotor. The plurality of permanent magnets 2 are arranged so that polarities alternate in a circumferential direction of the rotor. Each of the permanent magnets 2 is magnetized so that a magnetic path is oriented in a radial direction of the rotor. In this example, the plurality of permanent magnets 2 are arranged at intervals in the circumferential direction of the rotor. Further, the plurality of permanent magnets 2 are arranged at equal intervals in the circumferential direction of the rotor. The total number of permanent magnets 2 is six. Therefore, the rotor has six poles.

Next, a configuration of the rotor core 1 is described. The rotor core 1 includes a cylindrical portion 11 having a cylindrical shape and a pair of polygonal columnar portions 12, which are provided to both ends of the cylindrical portion 11 in an axial direction of the rotor, respectively. In this example, the polygonal columnar portion 12 of the pair of polygonal columnar portions 12, which is provided to one end of the cylindrical portion 11 in the axial direction, is referred to as a first polygonal columnar portion 12A, whereas the polygonal columnar portion 12, which is provided to another end of the cylindrical portion 11 in the axial direction, is referred to as a second polygonal columnar portion 12B. In this example, the "axial direction" is an axial direction of the rotor and is a direction indicated by the arrow RA of FIG. 1.

Figure 2:
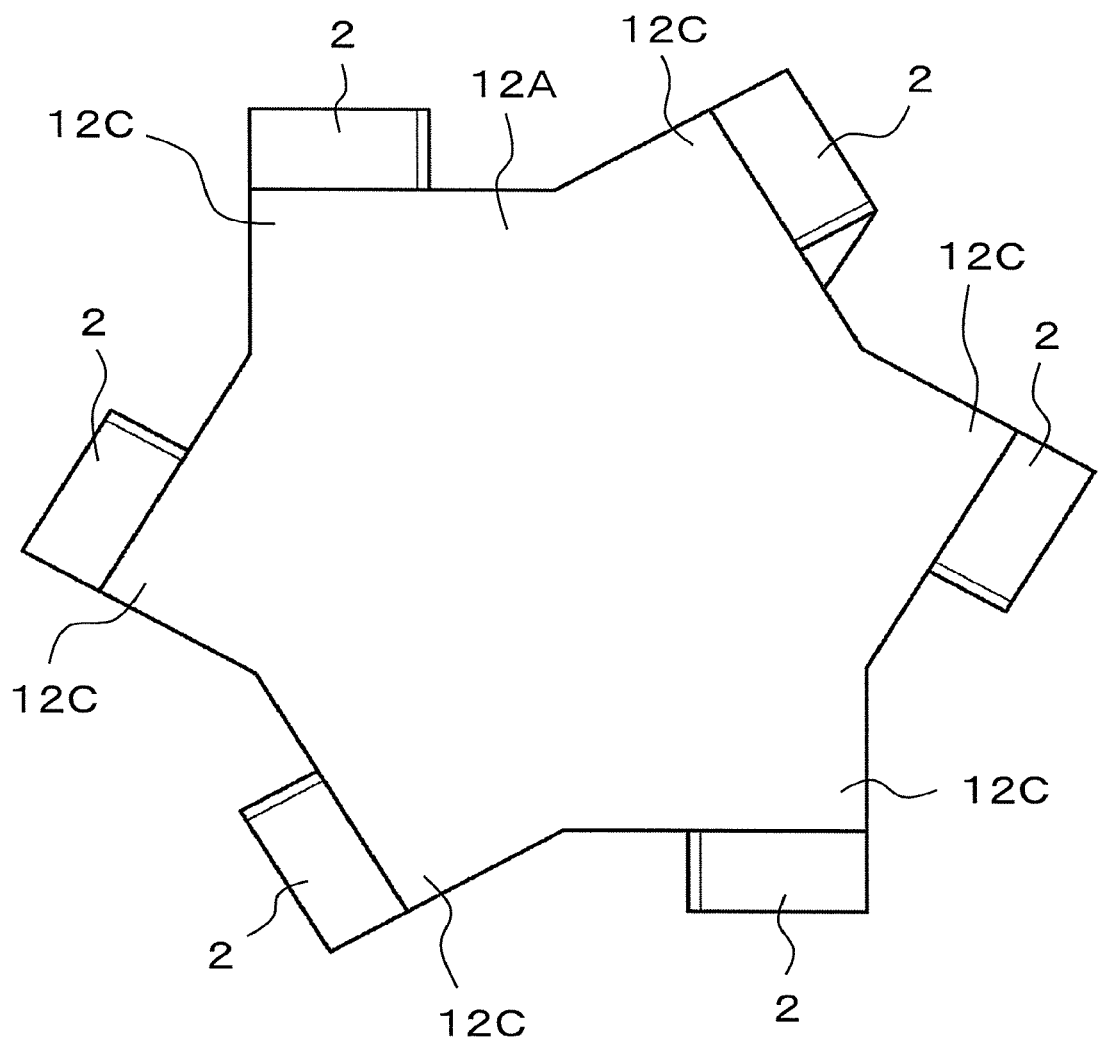
FIG. 2 is a plan view for illustrating permanent magnets and a first polygonal columnar portion of FIG. 1.

FIG. 2 is a plan view for illustrating the permanent magnets 2 and the first polygonal columnar portion 12A of FIG. 1. A plurality of corner portions 12C are formed on an outer peripheral portion of the first polygonal columnar portion 12A. The bonding surface of the permanent magnet 2 is bonded to one of a pair of surfaces that form the corner portion 12C of the first polygonal columnar portion 12A.

Figure 3:
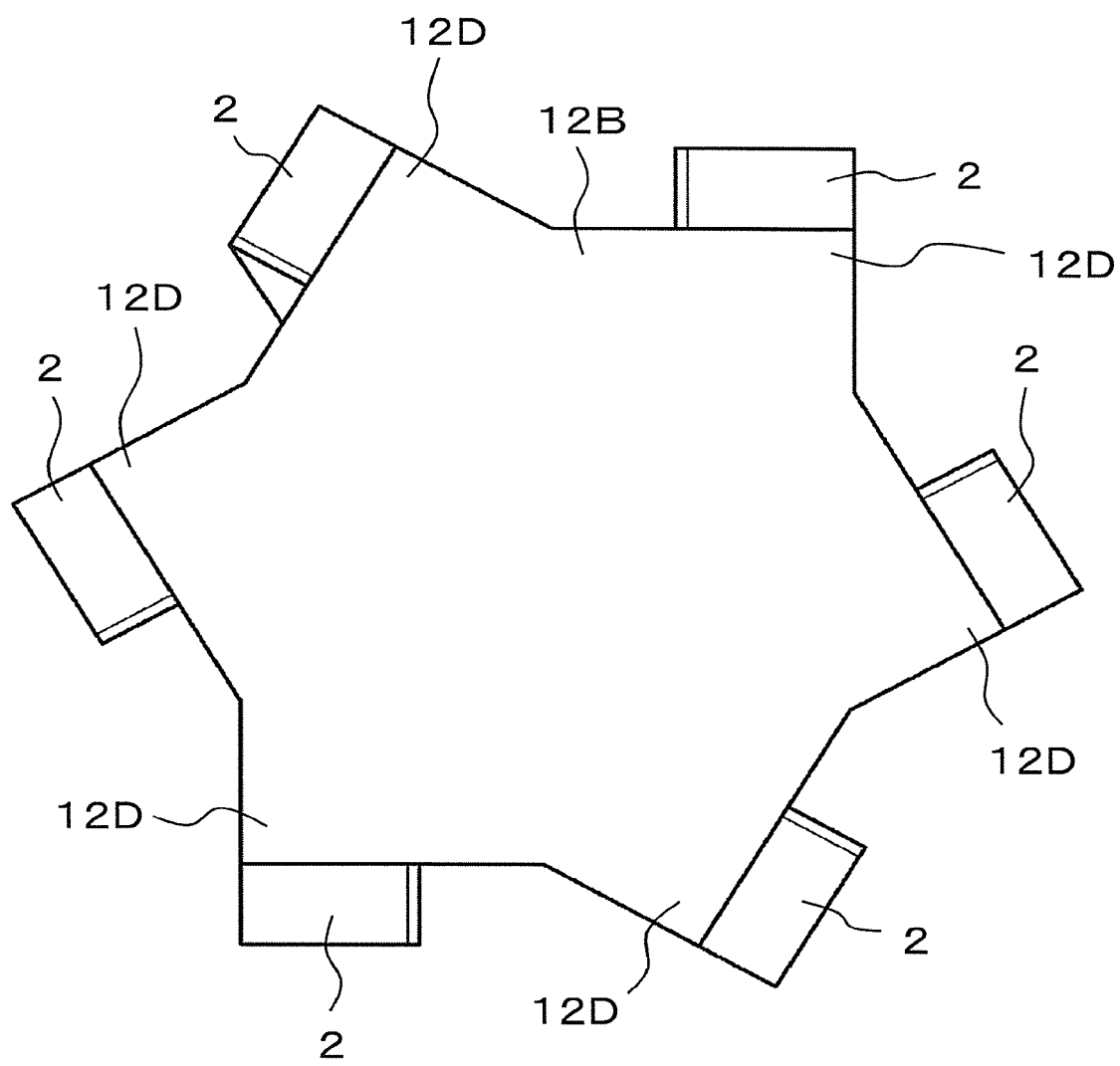
FIG. 3 is a plan view for illustrating the permanent magnets and a second polygonal columnar portion of FIG. 1.

FIG. 3 is a plan view for illustrating the permanent magnets 2 and the second polygonal columnar portion 12B of FIG. 1. A plurality of corner portions 12D are formed on an outer peripheral portion of the second polygonal columnar portion 12B. The bonding surface of the permanent magnet 2 is bonded to one of a pair of surfaces that form the corner portion 12D of the second polygonal columnar portion 12B.

Figure 4:
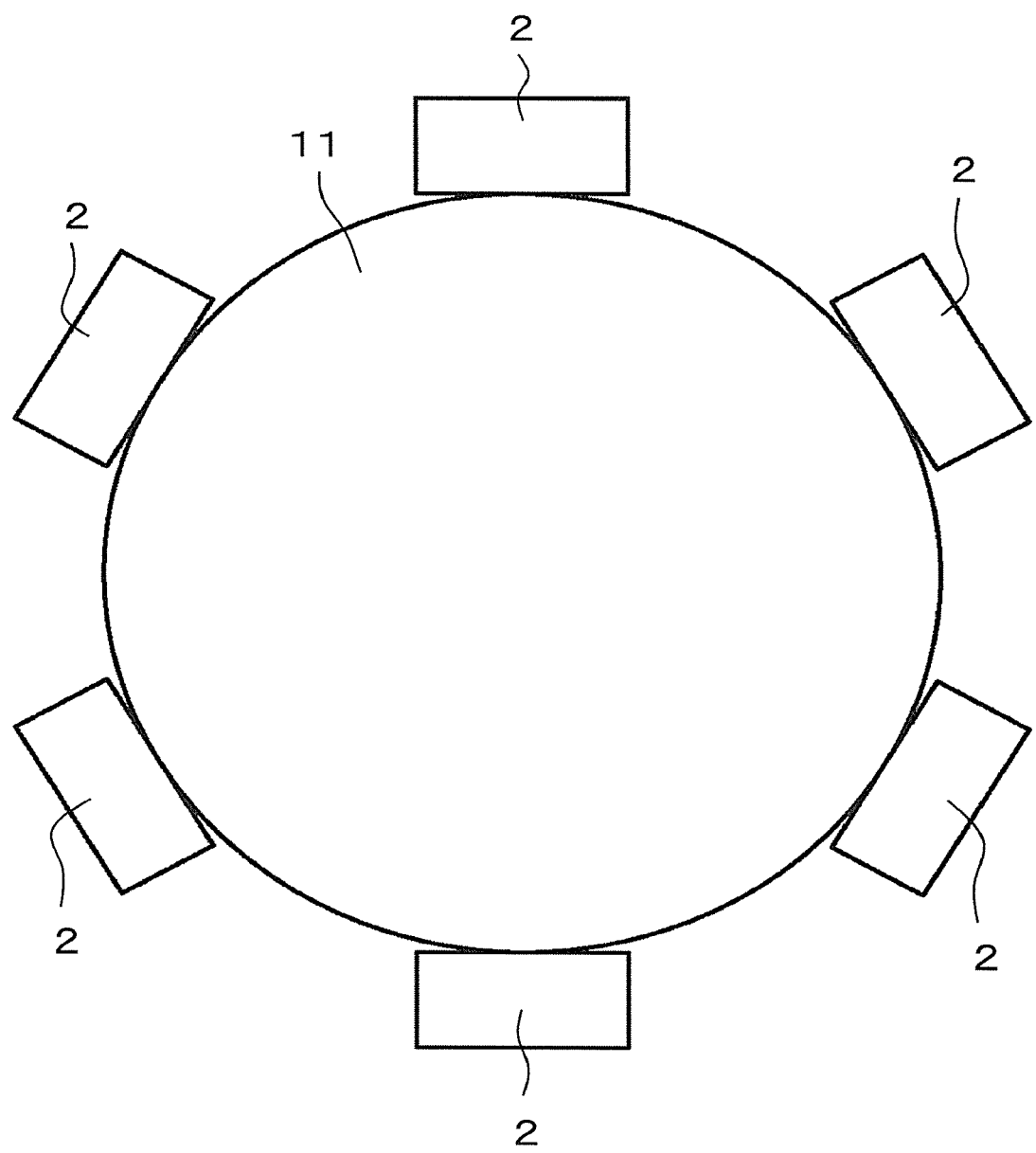
FIG. 4 is a plan view for illustrating the permanent magnets and a cylindrical portion of FIG. 1.

FIG. 4 is a plan view at an axial center position, for illustrating the permanent magnets 2 and the cylindrical portion 11 of FIG. 1. Each of the permanent magnets 2 is held in contact with the cylindrical portion 11 at one point.

As illustrated in FIG. 1, the permanent magnets 2 are bonded to the rotor core 1 under a state in which the permanent magnets 2 are skewed with respect to the axial direction. In other words, the rotor has a skew structure. The flat surface of the permanent magnet 2 is held in contact with a flat surface 12AS of the first polygonal columnar portion 12A and a flat surface 12BS of the second polygonal columnar portion 12B.

In the invention described in Patent Literature 1, the permanent magnets are positioned in the circumferential direction through use of the pair of polygonal columnar bodies that are arranged at both ends of the cylindrical portion of the rotor core in the axial direction so as to improve accuracy of positions of the permanent magnets in the circumferential direction. Positions of flat surfaces of the respective polygonal columnar bodies, which are to be held in contact with the permanent magnets, match each other in the circumferential direction as viewed in the axial direction. Therefore, it is difficult to bond the permanent magnets each having the flat bonding surface to an outer peripheral surface of the rotor core under a state in which the permanent magnets are skewed with respect to the axial direction.

In contrast, in the present invention, a center 12AC of the flat surface 12AS of the first polygonal columnar portion 12A and a center 12BC of the second polygonal columnar portion 12B do not match each other as viewed in the axial direction. In other words, the center 12AC of the flat surface 12AS of the first polygonal columnar portion 12A and the center 12BC of the second polygonal columnar portion 12B have such a positional relationship that the center 12AC and the center 12BC do not match each other in the circumferential direction. Namely, a centroid in the circumferential direction on the flat surface 12AS of the first polygonal columnar portion 12A is arranged so as to be spaced apart in the circumferential direction from a centroid in the circumferential direction on the flat surface 12BS of the second polygonal columnar portion 12B for the cylindrical portion 11. In this case, the circumferential direction is a circumferential direction of the cylindrical portion 11. Therefore, the permanent magnets 2 each having the flat bonding surface can be bonded to the rotor core under a state in which the permanent magnets 2 are skewed with respect to the axial direction. Further, the flat surfaces 12AS of the first polygonal columnar portion 12A and the flat surfaces 12BS of the second polygonal columnar portion 12B, to which the adjacent permanent magnets 2 are bonded, can easily be formed without interfering with each other.

When the permanent magnets 2 are bonded to the cylindrical portion 11 of the rotor core 1 under a state in which the permanent magnets 2 are skewed with respect to the axial direction, in other words, the permanent magnets 2 are bonded to the cylindrical portion 11 of the rotor core 1 in a skewed manner, each of the permanent magnets 2 is held in contact with the cylindrical portion 11 at only one contact portion. Therefore, it is difficult to fix the permanent magnets 2 to the cylindrical portion 11 at specific positions in the circumferential direction at a specific skew angle. Further, a distance between the permanent magnets 2 and the cylindrical portion 11 increases in an axially outward direction. Therefore, an area over which the permanent magnet 2 can be bonded through use of an adhesive or other material is reduced, and hence a bonding strength is decreased. In the invention described in Patent Literature 2, the bonding surface of the permanent magnet to the rotor core is formed into a curved surface extending along the rotor core, thereby improving retention for the permanent magnet onto the rotor core. In this case, however, manufacturing cost of the permanent magnet increases to render the rotor expensive.

In contrast, in the present invention, the permanent magnet 2 is retained by the flat surface 12AS of the first polygonal columnar portion 12A and the flat surface 12BS of the second polygonal columnar portion 12B. Therefore, positioning accuracy can be improved. Further, even when the permanent magnets 2 each having the flat bonding surface and being inexpensive are arranged so as to be skewed with respect to the axial direction, the positioning accuracy for the permanent magnets 2 can be increased. Further, a variation between the positions of the permanent magnets at the time of manufacture can be reduced. Further, a cogging torque can be effectively reduced by adopting the skew structure for the rotor.

Even when the flat surface 12AS and the flat surface 12BS are not located on the same plane and one of the flat surfaces is skewed with respect to another one of the flat surfaces, the permanent magnet 2 is held in contact with two portions, that is, with the flat surface 12AS or the flat surface 12BS and with the cylindrical portion 11 of the rotor core 1. Therefore, in comparison to the case in which the permanent magnet 2 has only one contact portion on the cylindrical portion 11, the positioning accuracy for the permanent magnets 2 is improved in the case in which the permanent magnets 2 are arranged so as to be skewed with respect to the axial direction.

For the rotor core 1, by manufacturing the cylindrical portion 11, the first polygonal columnar portion 12A, and the second polygonal columnar portion 12B as an integral member from a single steel material through cutting work, a positional variation in terms of, for example, coaxiality between the cylindrical portion 11, the first polygonal columnar portion 12A, and the second polygonal columnar portion 12B can be reduced. In this manner, the permanent magnets 2 can be positioned with high accuracy. Further, the cogging torque can be effectively reduced. For the manufacture at lower cost, however, the cylindrical portion 11 is manufactured by cutting work on a round bar, and the first polygonal columnar portion 12A and the second polygonal columnar portion 12B are manufactured by laminating thin sheets each being formed by press-punching, are manufactured by cutting work on a metal bulk, or are formed of pressed powder cores. Through combination of the thus manufactured cylindrical portion 11, first polygonal columnar portion 12A, and second polygonal columnar portion 12B, the rotor core 1 may be formed. When the rotor has a large outer diameter, processing of the first polygonal columnar portion 12A and the second polygonal columnar portion 12B becomes expensive. Therefore, separately manufactured portions may be fastened. In this manner, when the cylindrical portion 11, the first polygonal columnar portion 12A, and the second polygonal columnar portion 12B are independent members, projections for positioning may be formed on joint surfaces of the cylindrical portion 11, the first polygonal columnar portion 12A, and the second polygonal columnar portion 12B to achieve the positioning between the cylindrical portion 11 and the first polygonal columnar portion 12A and between the cylindrical portion 11 and the second polygonal columnar portion 12B with high accuracy. Further, when the polygonal columnar portions 12 are magnetic bodies, the flat portions of the polygonal columnar portions 12 are held in close contact with the permanent magnets 2. As a result, permeance of a magnetic path for magnetic flux generated from each of the permanent magnets 2 increases to increase a magnetic flux amount. In this manner, a torque of the rotary electric machine can be improved.

As described above, the rotor for a permanent magnet rotary electric machine according to the first embodiment of the present invention includes the rotor core 1 including the cylindrical portion 11 and the pair of polygonal columnar portions 12 provided to both ends of the cylindrical portion 11 in the axial direction, and the permanent magnets 2 each having the bonding surface which is flat and bonded to the rotor core 1. The pair of polygonal columnar portions 12 has the flat surface 12AS and the flat surface 12BS which are arranged so that the center positions are spaced apart from each other as viewed in the axial direction. The bonding surface of each of the permanent magnets 2 is bonded to the flat surface 12AS and the flat surface 12BS of the pair of polygonal columnar portions 12 under the state in which the permanent magnets 2 are skewed with respect to the axial direction. Therefore, the permanent magnets 2 can be bonded to the rotor core 1 with highly accurate positioning. At the same time, the permanent magnets 2 can be bonded to the rotor core 1 under the state in which the permanent magnets 2 are skewed with respect to the axial direction. The bonding surface of each of the permanent magnets 2 is flat, and hence the permanent magnets 2 can be manufactured at low cost. Further, when the polygonal columnar portions 12 are magnetic bodies, the close contact between the permanent magnets 2 and the polygonal columnar portions 12 enables the improvement of the magnetic flux amount to improve the torque of the rotary electric machine.

In the first embodiment described above, a shaft configured to support the rotor is omitted. Although each of the cylindrical portion 11, the first polygonal columnar portion 12A, and the second polygonal columnar portion 12B is uniformly solid to a central axis in FIG. 1, the cylindrical portion 11, the first polygonal columnar portion 12A, and the second polygonal columnar portion 12B may be hollow. In the hollow portions, a solid or hollow cylindrical body extending in the axial direction may be provided as the shaft. Alternatively, extended portions of the cylindrical portion 11, which are integral with the cylindrical portion 11, may be provided as the shaft. The extended portions pass through the hollow first polygonal columnar portion 12A and the hollow second polygonal columnar portion 12B to extend axially outward from the first polygonal columnar portion 12A and the second polygonal columnar portion 12B, and are processed to have a suitably-selected outer diameter.

Figure 5:
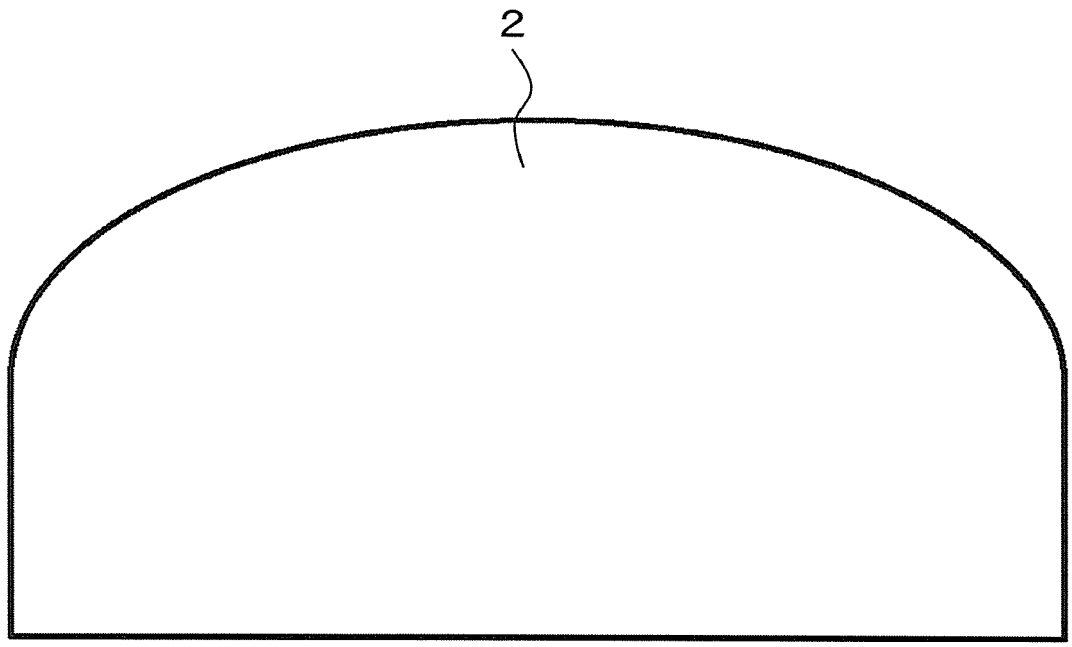
FIG. 5 is a sectional view for illustrating a modification example of the permanent magnet of FIG. 4.
Figure 6:
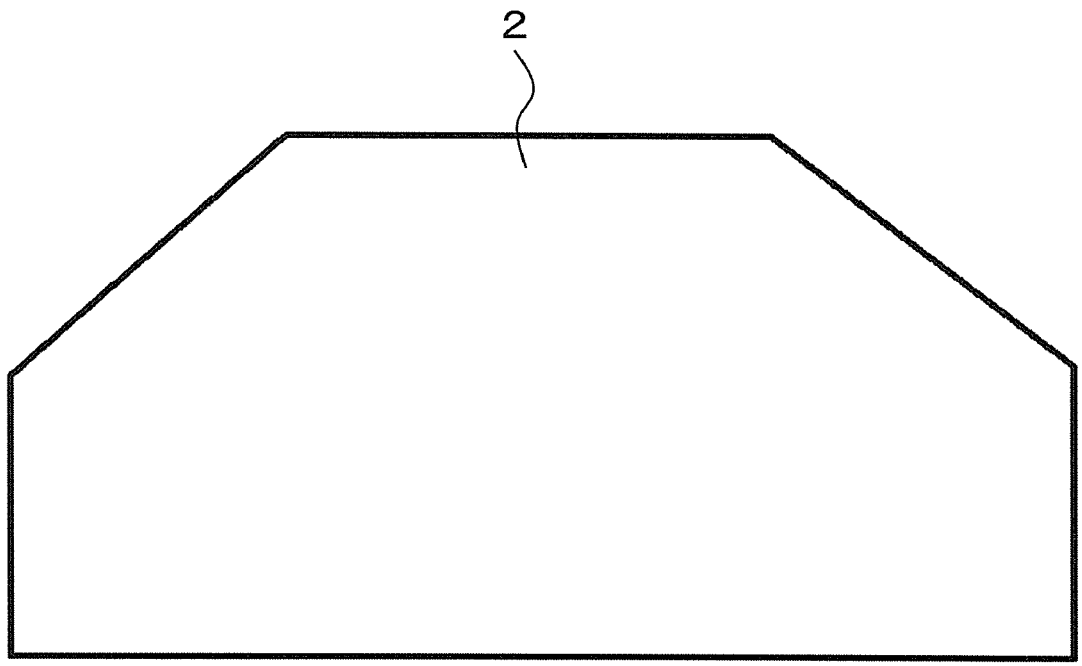
FIG. 6 is a sectional view for illustrating a modification example of the permanent magnet of FIG. 4.

Although the surface of each of the permanent magnets 2, which is to be bonded to the rotor core 1, is flat, a surface on the side opposite to the flat surface is not required to be flat. In this case, a shape of the permanent magnet 2 may be, for example, circular on one side and flat on the opposite side as illustrated in FIG. 5 or may be trapezoidal as illustrated in FIG. 6. In those cases, the torque is improved along with an increase in magnetic flux to a stator opposed to the rotor. Further, in those cases, a magnetomotive force distribution generated by the permanent magnet 2 changes smoothly in the circumferential direction in comparison to a case in which the permanent magnet 2 has the flat surface. Therefore, the cogging torque can be further reduced.

Second Embodiment

Figure 7:
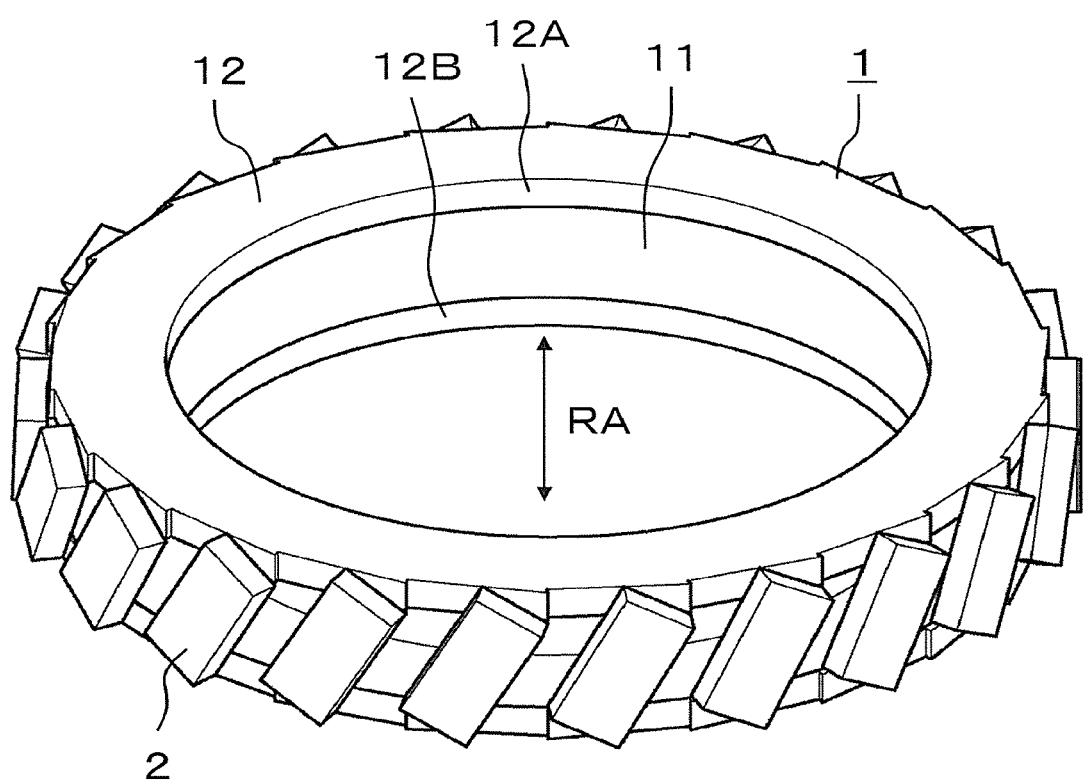
FIG. 7 is a perspective view for illustrating a rotor for a permanent magnet rotary electric machine according to a second embodiment of the present invention.

Although the rotor having six poles has been described in the first embodiment, any number of poles may be provided. FIG. 7 is a perspective view for illustrating a rotor for a permanent magnet rotary electric machine according to a second embodiment of the present invention. In the second embodiment, the number of poles is larger than the number of poles in the first embodiment and is twenty-two. Specifically, the number of permanent magnets 2 is twenty-two. The remaining configuration is the same as the configuration in the first embodiment.

As the number of poles increases, the torque of the rotary electric machine is improved. As the number of permanent magnets 2 increases, however, there is a higher risk in that a manufacturing variation between mounting positions for the permanent magnets 2 may increase. Therefore, the polygonal columnar portions 12 of the present invention and the highly accurate positioning using the polygonal columnar portions 12 are effective.

As described above, the rotor for a permanent magnet rotary electric machine according to the second embodiment of the present invention can improve the torque of the rotary electric machine and suppress the increase in manufacturing variation between the mounting positions for the permanent magnets 2 in comparison to the first embodiment.

Third Embodiment

Figure 8:
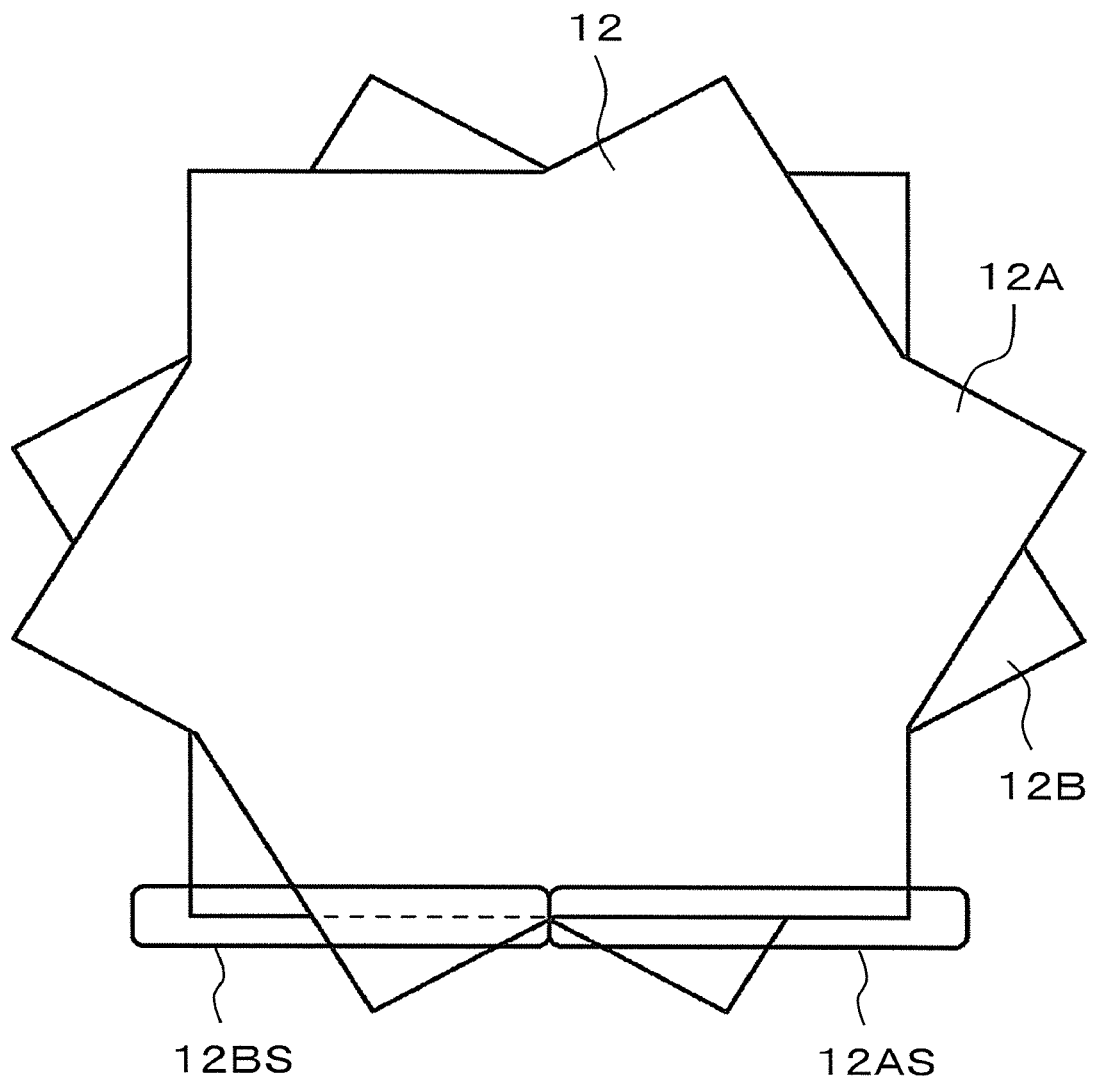
FIG. 8 is a plan view for illustrating a pair of polygonal columnar portions in a rotor for a permanent magnet rotary electric machine according to a third embodiment of the present invention.

FIG. 8 is a plan view for illustrating a pair of polygonal columnar portions in a rotor for a permanent magnet rotary electric machine according to a third embodiment of the present invention. The flat surface 12AS of the first polygonal columnar portion 12A and the flat surface 12BS of the second polygonal columnar portion 12B are arranged on the same plane. In other words, the flat surface 12AS of the first polygonal columnar portion 12A and the flat surface 12BS of the second polygonal columnar portion 12B of the pair of polygonal columnar portions 12, to which the bonding surface of the same permanent magnet 2 is bonded, are arranged on the same plane. The remaining configuration is the same as the configuration in the first embodiment.

The flat surface 12AS of the first polygonal columnar portion 12A and the flat surface 12BS of the second polygonal columnar portion 12B are arranged on the same plane. Therefore, adhesion between the first polygonal columnar portion 12A and the permanent magnets 2 and between the second polygonal columnar portion 12B and the permanent magnets 2 is improved to improve the retention for the permanent magnets 2 by the first polygonal columnar portion 12A and the second polygonal columnar portion 12B. In this manner, in comparison to the first embodiment, the positioning accuracy can be further improved. Further, with the skew structure, the cogging torque can be effectively reduced. Further, a contact area between each of the permanent magnets 2 and the rotor core 1 is increased to increase the permeance of the magnetic path for the magnetic flux generated from each of the permanent magnets 2. As a result, the magnetic flux amount is increased to improve the torque. Therefore, a magnetic steel sheet material having a high permeability is desirable as the material for the polygonal columnar portions 12.

As described above, according to the rotor for a permanent magnet rotary electric machine according to the third embodiment of the present invention, the flat surface 12AS and the flat surface 12BS of the pair of polygonal columnar portions 12, to which the bonding surface of the same permanent magnet 2 is to be bonded, are arranged on the same plane. Therefore, the adhesion between the first polygonal columnar portion 12A and the permanent magnets 2 and between the second polygonal columnar portion 12B and the permanent magnets 2 can be improved. In this manner, the retention for the permanent magnets 2 by the first polygonal columnar portion 12A and the second polygonal columnar portion 12B can be improved.

Fourth Embodiment

Figure 9:
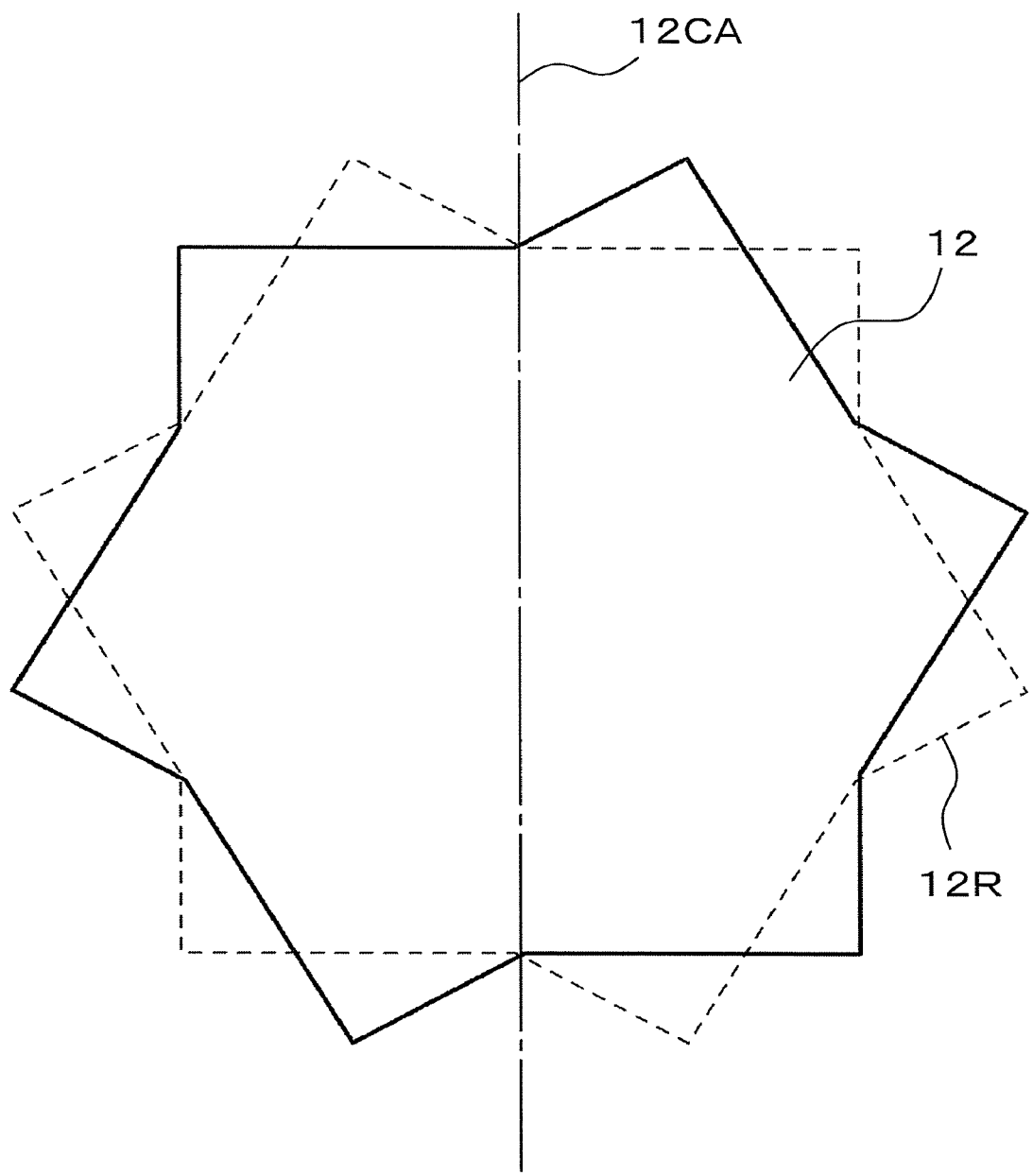
FIG. 9 is a plan view for illustrating a polygonal columnar portion in a rotor for a permanent magnet rotary electric machine according to a fourth embodiment of the present invention.

FIG. 9 is a plan view for illustrating a polygonal columnar portion in a rotor for a permanent magnet rotary electric machine according to a fourth embodiment of the present invention. A plane of the polygonal columnar portion 12, which is perpendicular to the axial direction, has an asymmetric shape with respect to a suitably-selected center line 12CA passing through a center of the polygonal columnar portion 12. In other words, the shape of the polygonal columnar portion 12 as viewed in the axial direction is asymmetric with respect to the center line 12CA.

A broken line 12R of FIG. 9 indicates a shape obtained by vertically inverting the plane of the polygonal columnar portion 12, which is perpendicular to the axial direction, about the center line 12CA. The broken line 12R matches a shape of a plane of the another polygonal columnar portion 12, which is perpendicular to the axial direction. In other words, when vertically inverted about the center line 12CA, the shape of the one polygonal columnar portion 12 as viewed in the axial direction matches the shape of the another polygonal columnar portion 12 as viewed in the axial direction. The remaining configuration is the same as the configuration in the first embodiment.

When the permanent magnet 2 is bonded to the flat surface 12AS of the first polygonal columnar portion 12A and the flat surface 12BS of the second polygonal columnar portion 12B, the flat surface 12AS and the flat surface 12BS, which correspond to the permanent magnet 2, are formed.

Therefore, the permanent magnet 2 can be bonded in a skewed manner without being obstructed by portions other than the flat surface 12AS and the flat surface 12BS. Further, each of the first polygonal columnar portion 12A and the second polygonal columnar portion 12B can be formed of the same component. Therefore, for example, in a case of press-molding of a thin sheet, the first polygonal columnar portion 12A and the second polygonal columnar portion 12B can be manufactured with one kind of die. Further, in a case of a processed item formed by processing such as wire electric discharge machining, after a polygonal columnar body that is elongated in the axial direction is cut out by single processing, the polygonal columnar body is divided into a plurality of pieces in a direction perpendicular to the axial direction. In this manner, the first polygonal columnar portion 12A and the second polygonal columnar portion 12B can be manufactured at a time, and therefore can be manufactured at low cost.

As described above, according to the rotor for a permanent magnet rotary electric machine according to the fourth embodiment of the present invention, the shape of the polygonal columnar portion 12 as viewed in the axial direction is asymmetric with respect to the center line 12CA and matches the shape of the another polygonal columnar portion 12 as viewed in the axial direction when vertically inverted about the center line 12CA. Therefore, the permanent magnets 2 can be bonded in a skewed manner without being obstructed by the portions other than the flat surfaces 12AS and the flat surfaces 12BS. Further, the pair of polygonal columnar portions 12 can be manufactured at low cost.

Fifth Embodiment

Figure 10:
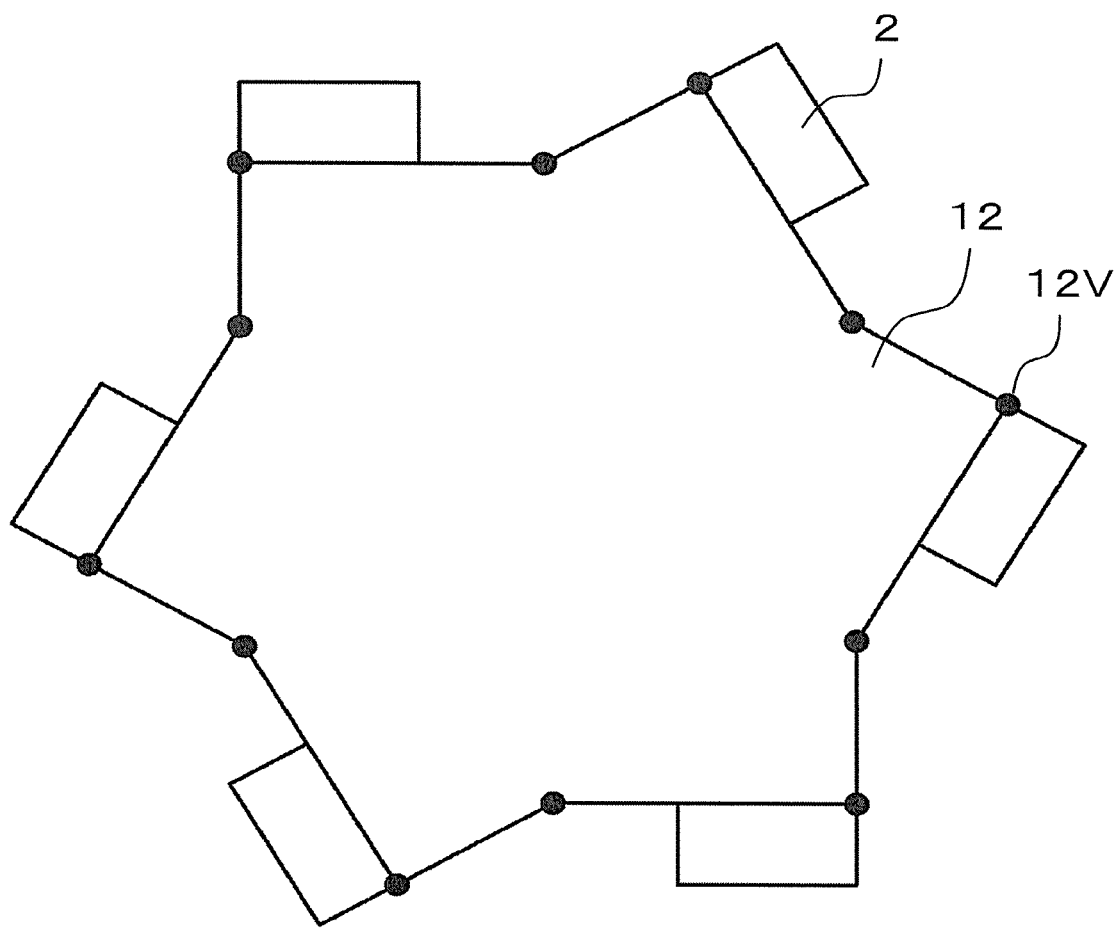
FIG. 10 is a plan view for illustrating permanent magnets and a polygonal columnar portion in a rotor for a permanent magnet rotary electric machine according to a fifth embodiment of the present invention.

FIG. 10 is a plan view for illustrating permanent magnets and a polygonal columnar portion in a rotor for a permanent magnet rotary electric machine according to a fifth embodiment of the present invention. An outer diameter-side profile line of a plane of the polygonal columnar portion 12, which is perpendicular to the axial direction, has the number of vertices 12V twice as many as the number of permanent magnets 2, specifically, twice as many as the number of poles. In other words, an outer shape of the polygonal columnar portion 12 as viewed in the axial direction is a polygonal shape having the number of vertices twice as many as the number of poles.

It is desired that the vertices 12V be arranged so that one side of the polygonal columnar portion 12 is parallel to the flat bonding surface of the permanent magnet 2 on the plane of the polygonal columnar portion 12, which is perpendicular to the axial direction. Further, it is desired that the vertices 12V be arranged so that one side of an outer-diameter shape of the polygonal columnar portion 12, which is perpendicular to the axial direction, is larger than a long side of a cross section of the permanent magnet 2, which is perpendicular to the axial direction. The remaining configuration is the same as the configuration in the first embodiment.

The outer diameter-side profile line of the plane of the polygonal columnar portion 12, which is perpendicular to the axial direction, has the number of vertices 12V twice as many as the number of poles. Therefore, the polygonal columnar portion 12 has one pair of flat surfaces corresponding to each of the permanent magnets 2. In this manner, the permanent magnets 2 can be bonded in a skewed manner. Thus, the polygonal columnar portion 12 has a simple planar shape. Therefore, in a case of press working on a thin sheet, the number of times of execution of a punching step can be minimized. In a case of cutting work, the number of times of execution of a processing step can be minimized. Therefore, processing cost required to form the polygonal columnar portion 12 can be reduced to be low. Further, the polygonal columnar portion 12 having a maximum thickness and having the flat surfaces for retaining the permanent magnets 2 is obtained. Therefore, the rotor core 1 having a high stiffness can be obtained.

As described above, according to the rotor for a permanent magnet rotary electric machine according to the fifth embodiment of the present invention, the outer shape of the polygonal columnar portion 12 as viewed in the axial direction is the polygonal shape having the number of vertices twice as many as the number of poles. Thus, the polygonal columnar portion 12 has one pair of flat surfaces corresponding to each of the permanent magnets 2. In this manner, the permanent magnets 2 can be bonded in a skewed manner. Further, the polygonal columnar portion 12 has a simple planar shape. Therefore, the processing cost required to form the polygonal columnar portion 12 can be reduced to be low. Further, the polygonal columnar portion 12 having a large thickness can be obtained, and hence the rotor core 1 having a high stiffness can be obtained.

Sixth Embodiment

Figure 11:
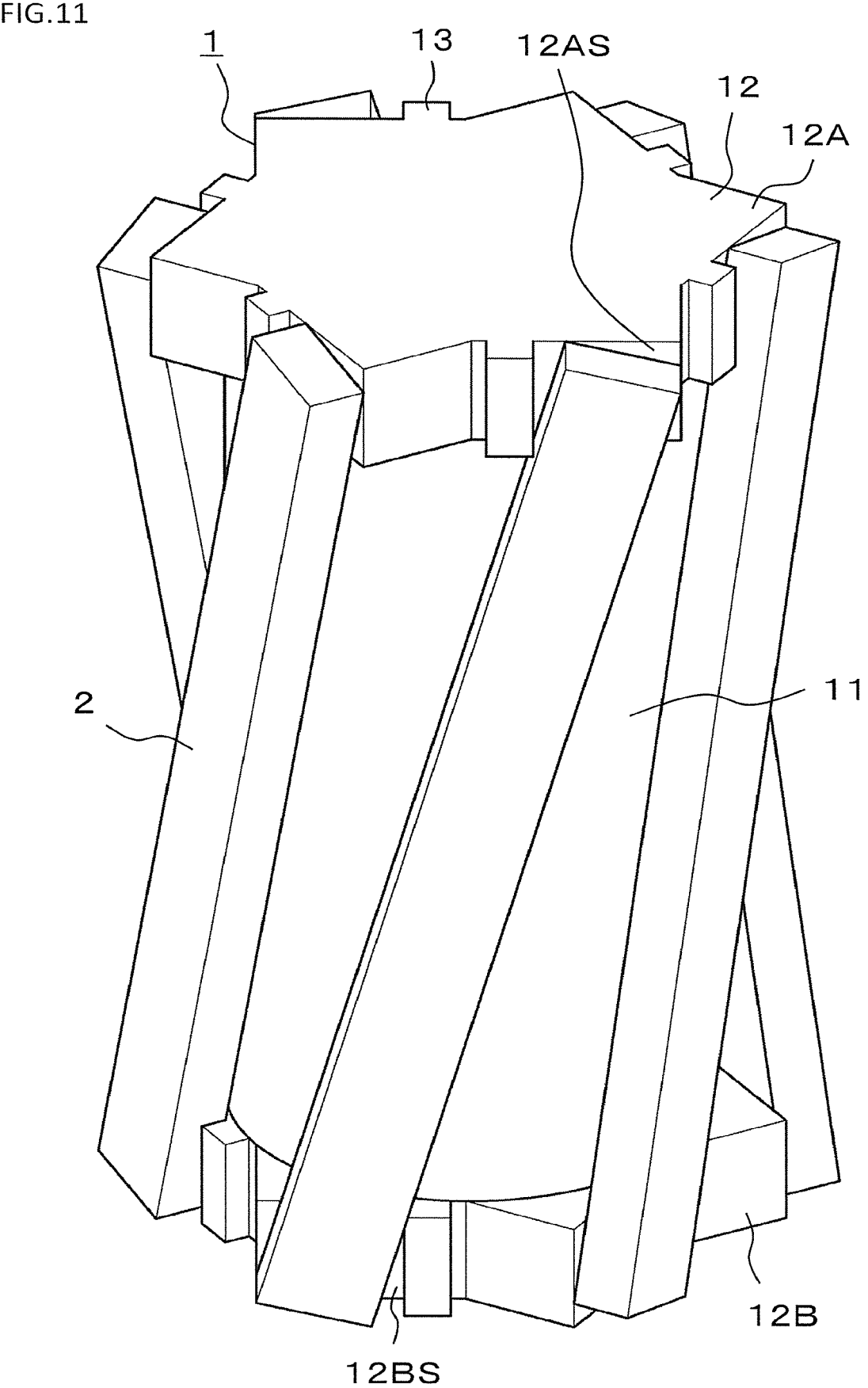
FIG. 11 is a perspective view for illustrating a rotor for a permanent magnet rotary electric machine according to a sixth embodiment of the present invention.

FIG. 11 is a perspective view for illustrating a rotor for a permanent magnet rotary electric machine according to a sixth embodiment of the present invention. The rotor for a permanent magnet rotary electric machine includes the rotor core 1 and the plurality of permanent magnets 2 provided to the outer peripheral portion of the rotor core 1. The rotor core 1 includes the cylindrical portion 11 and the pair of polygonal columnar portions 12, which are provided to both ends of the cylindrical portion 11 in the axial direction, respectively. In this example, the polygonal columnar portion 12 of the pair of polygonal columnar portions 12, which is provided to one end of the cylindrical portion 11 in the axial direction, is referred to as the first polygonal columnar portion 12A, whereas the polygonal columnar portion 12, which is provided to another end of the cylindrical portion 11 in the axial direction, is referred to as the second polygonal columnar portion 12B.

Figure 12:
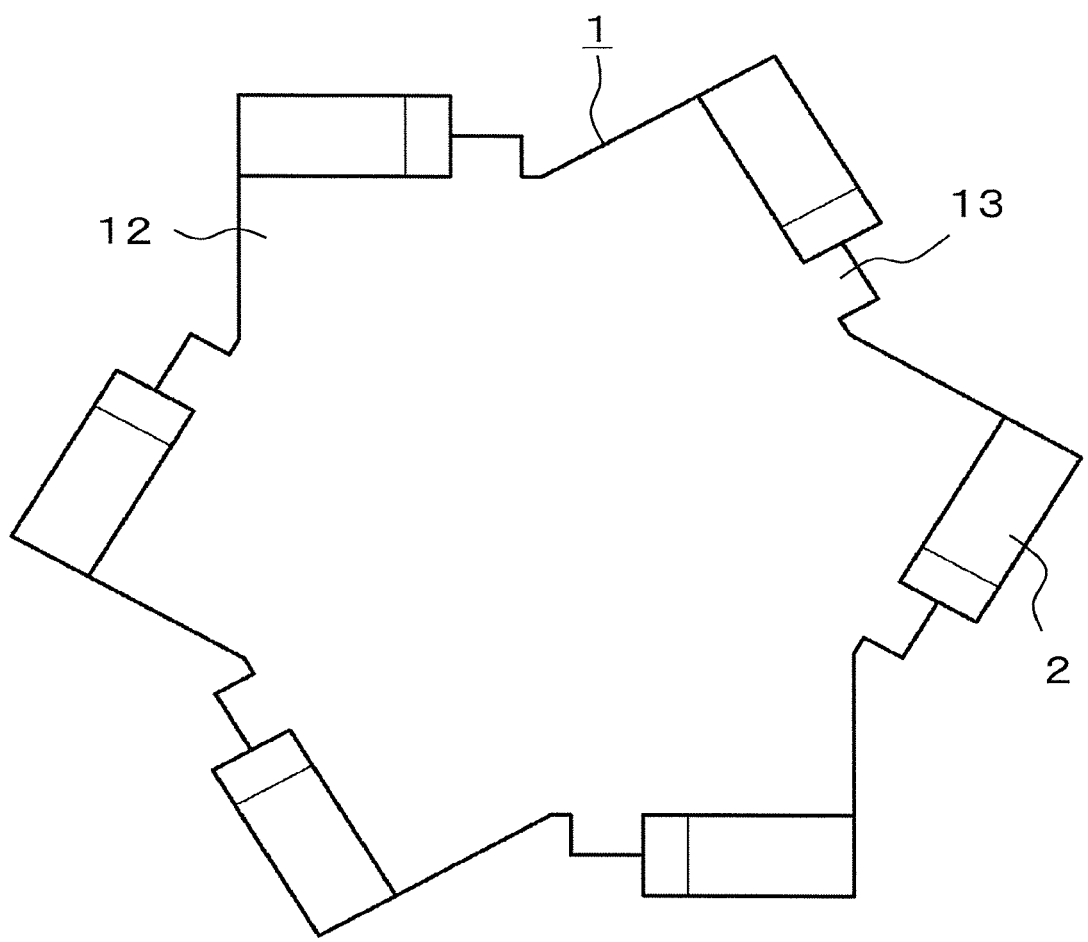
FIG. 12 is a plan view for illustrating the rotor for a permanent magnet rotary electric machine of FIG. 11.

FIG. 12 is a plan view for illustrating the rotor for a permanent magnet rotary electric machine of FIG. 11. The rotor core 1 further includes a plurality of projections 13 formed on the outer peripheral portion of the polygonal columnar portion 12. The plurality of projections 13 are each formed on only one side of the permanent magnet 2 in the circumferential direction. In other words, the rotor core 1 further includes the projections 13 each formed on one side of the permanent magnet 2 in the circumferential direction. The projections 13 serve as circumferential positioning portions configured to position the permanent magnets 2 in the circumferential direction with respect to the polygonal columnar portion 12.

The projections 13 are arranged equiangularly, similarly to the permanent magnets 2. As illustrated in FIG. 11, each of the projections 13 has a cuboidal shape having the same axial length as an axial length of the polygonal columnar portion 12 which is uniformly extended in the axial direction. Further, the projections 13 are formed integrally with the polygonal columnar portion 12. Further, the projections 13 are arranged on the flat surfaces 12AS of the first polygonal columnar portion 12A and the flat surfaces 12BS of the second polygonal columnar portion 12B of the rotor core 1. The same permanent magnet 2 that is bonded to the flat surface 12AS and the flat surface 12BS is held in contact with one side of the cuboidal shape of each of the projections 13. The remaining configuration is the same as the configuration in the first embodiment.

In order to reduce a stress generated between the projection 13 and the permanent magnet 12 or prevent chipping or other defects of the permanent magnet 2, a chamfer or a fillet may be formed at a contact portion between the projection 13 and the permanent magnet 2. Further, a shape of the projection 13 is not limited to a shape that is uniform in the axial direction and may be, for example, a shape that is skewed at the same angle as the long side of the permanent magnet 2 and is held in surface contact with the permanent magnet 2 or a stepwise shape in the axial direction, which has a plurality of contact portions to be held in contact with the permanent magnet 2.

Although a jig for circumferential positioning of the permanent magnets 2 to be bonded to the rotor core 1 is required at the time of manufacture of the rotor in the first to fifth embodiments described above, the jig for circumferential positioning is not needed owing to the projections 13 in the sixth embodiment. Therefore, the manufacturing cost can be further reduced. Further, the projections 13 fix the permanent magnets 2 so as to prevent the permanent magnets 2 from being moved in the circumferential direction. Therefore, a shearing stress applied to adhering portions when the permanent magnets 2 and the rotor core 1 are fixed through adhesion can be reduced. Therefore, a risk of release of the permanent magnets 2 from the rotor core 1 can be reduced. Further, the projections 13 are formed on each of the first polygonal columnar portion 12A and the second polygonal columnar portion 12B. The projection 13 formed on the first polygonal columnar portion 12A and the projection 13 formed on the second polygonal columnar portion 12B are arranged on the sides opposite to each other in the circumferential direction with respect to the permanent magnet 2. Therefore, independently of a rotating direction, the risk of disengagement of the permanent magnets 2 can be reduced.

Although the projections formed on the polygonal columnar portions that are present at both ends of the rotor core in the axial direction are extended in the axial direction to support and position the permanent magnets in the circumferential direction in Patent Literature 1 as in the sixth embodiment, the permanent magnets, which are arranged in a skewed manner, cannot be retained because of the presence of the projections on both sides of the permanent magnet in the circumferential direction. With the configuration in which the projections 13 are present on only one side in the circumferential direction as in the sixth embodiment, the permanent magnets 2, which are arranged in a skewed manner, can be retained in the circumferential direction.

As described above, according to the rotor for a permanent magnet rotary electric machine according to the sixth embodiment of the present invention, the rotor core 1 further includes the projections 13 each formed on one side of the permanent magnet 2 in the circumferential direction. Therefore, the positions of the permanent magnets 2 in the circumferential direction can be easily determined.

Seventh Embodiment

Figure 13:
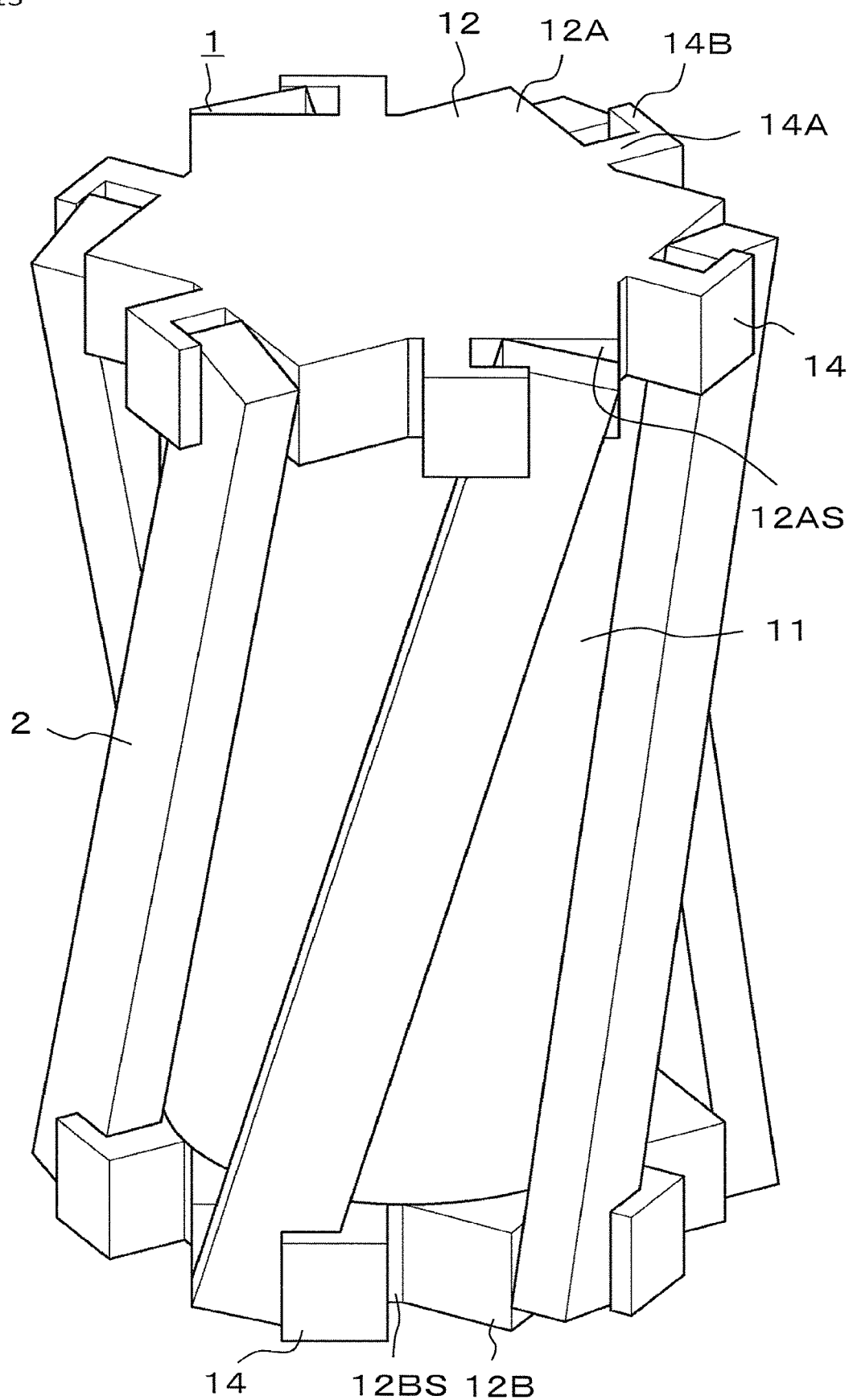
FIG. 13 is a perspective view for illustrating a rotor for a permanent magnet rotary electric machine according to a seventh embodiment of the present invention.
Figure 14:
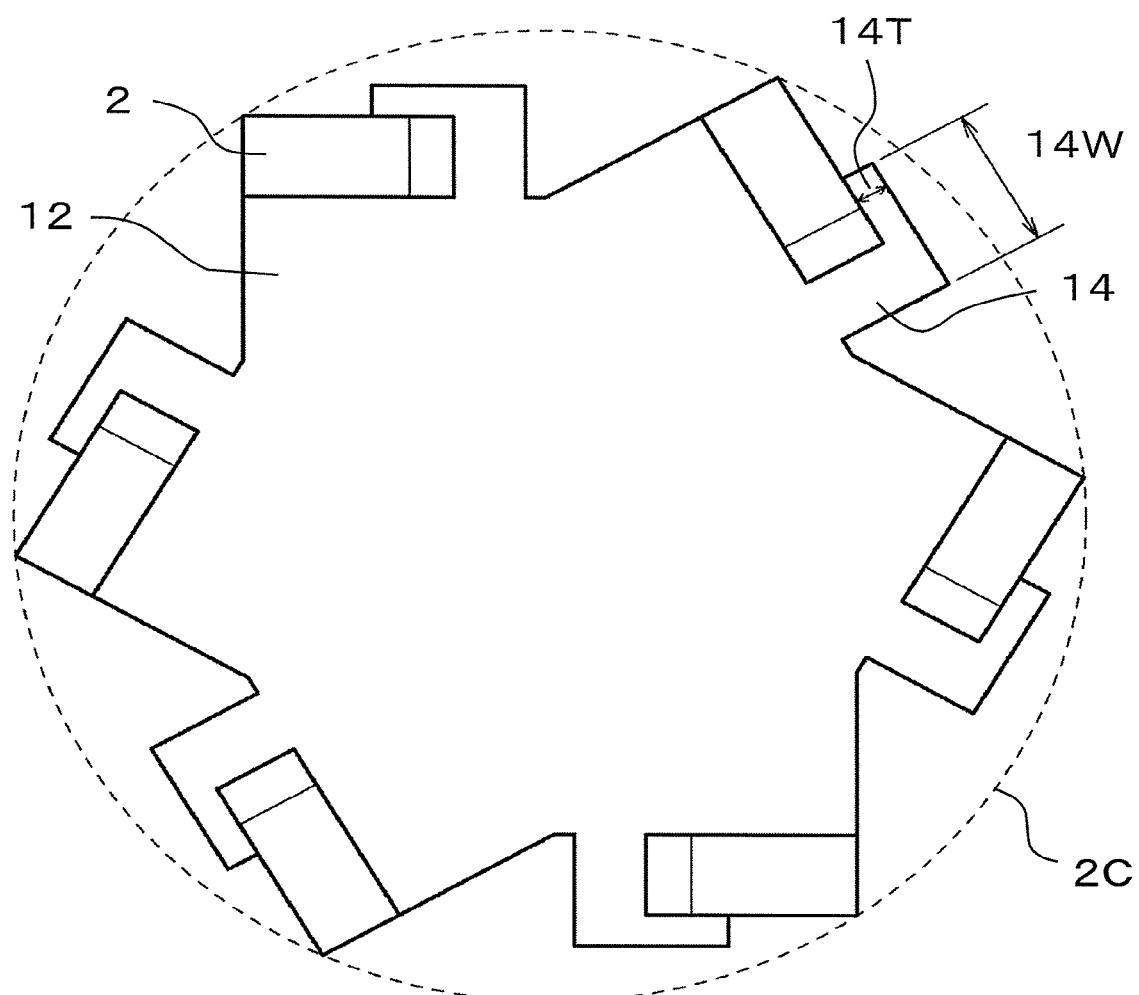
FIG. 14 is a plan view for illustrating the rotor for a permanent magnet rotary electric machine of FIG. 13.

FIG. 13 is a perspective view for illustrating a rotor for a permanent magnet rotary electric machine according to a seventh embodiment of the present invention, and FIG. 14 is a plan view for illustrating the rotor for a permanent magnet rotary electric machine of FIG. 13. The rotor for a permanent magnet rotary electric machine includes the rotor core 1 and the plurality of permanent magnets 2 provided to the outer peripheral portion of the rotor core 1. The rotor core 1 includes the cylindrical portion 11 and the pair of polygonal columnar portions 12, which are provided to both ends of the cylindrical portion 11 in the axial direction, respectively. In this example, the polygonal columnar portion 12 of the pair of polygonal columnar portions 12, which is provided to one end of the cylindrical portion 11 in the axial direction, is referred to as the first polygonal columnar portion 12A, whereas the polygonal columnar portion 12, which is provided to another end of the cylindrical portion 11 in the axial direction, is referred to as the second polygonal columnar portion 12B.

The rotor core 1 further includes a plurality of projections 14 formed on the outer peripheral portion of the polygonal columnar portion 12. The plurality of projections 14 are each formed on only one side of the permanent magnet 2 in the circumferential direction. In other words, the rotor core 1 further includes the projections 14 each formed on one side of the permanent magnet 2 in the circumferential direction. The projection 14 includes a circumferential positioning portion 14A configured to position the permanent magnet 2 in the circumferential direction with respect to the polygonal columnar portion 12 and a disengagement preventing portion 14B configured to restrict radially outward movement of the permanent magnet 2 with respect to the polygonal columnar portion 12.

Although a planar shape of the projection 13, which is perpendicular to the axial direction, is rectangular in the sixth embodiment, a planar shape of the projection 14, which is perpendicular to the axial direction, is an L-shape in the seventh embodiment. The plurality of projections 14 are arranged equiangularly. Further, the projection 14 is a polygonal columnar body extended in the axial direction, similarly to the polygonal columnar portion 12 uniformly extended in the axial direction. Further, the projections 14 are formed on the flat surfaces 12AS of the first polygonal columnar portion 12A and the flat surfaces 12BS of the second polygonal columnar portion 12B. Further, the same permanent magnet 2 bonded to the flat surfaces 12AS and 12BS is held in contact with one side of each of the projections 14. Therefore, similarly to the sixth embodiment, the effects of increasing accuracy of the positioning of the permanent magnets 2 in the circumferential direction and reducing the risk of release of the permanent magnets 2 can be obtained. Further, the projection 14 has an area that covers an outer diameter of the permanent magnet 2. Therefore, even when the permanent magnet 2 is released from the rotor core 1, the disengagement of the permanent magnet 2 to the radially outer side can be suppressed so as to prevent a risk of collision of the permanent magnet 2 against the stator or other components and other risks.

In the invention described in Patent Literature 3, Y-shaped projections for preventing disengagement of permanent magnets are formed at both ends of the rotor in the axial direction. However, the Y-shaped projections retain the permanent magnet on both sides in the circumferential direction, and positions of the Y-shaped projections that retain the same permanent magnet match in the axial direction. Therefore, it is difficult to retain the permanent magnets that are arranged on the rotor core in a skewed manner. In contrast, in the seventh embodiment, the L-shaped projection 14 is arranged on only one side of each of the permanent magnets 2, and the projections 14 retain the permanent magnet 2. Thus, even when the permanent magnets 2 are arranged in the skewed manner, the permanent magnets 2 can be easily retained.

Further, the L-shaped projections 14 are arranged inside a circle 2C formed with points of the permanent magnets 2, which are located on an outermost diameter. In this manner, the permanent magnets 2 are arranged on the outermost diameter of the rotor. Thus, for constituting the rotary electric machine, a large amount of magnetic flux flows to the stator. Therefore, the torque can be increased. In the vicinity of the L-shaped projection 14, however, the magnetic flux of the permanent magnet 2 leaks to the projection 14. Thus, it is desired that a circumferential width 14W of the projection 14 and a thickness 14T being a radial width of an outer-diameter portion of the projection 14 be as small as possible. The remaining configuration is the same as the configuration in the first embodiment.

As described above, according to the rotor for a permanent magnet rotary electric machine according to the seventh embodiment of the present invention, the rotor core 1 further includes the projections 14 each formed on one side of the permanent magnet 2 in the circumferential direction and on the radially outer side of the permanent magnet 2. Therefore, the effects of increasing the accuracy of the positioning of the permanent magnets 2 in the circumferential direction and reducing the risk of release of the permanent magnets 2 are obtained. Further, even when the permanent magnet 2 is released from the rotor core 1, the disengagement of the permanent magnet 2 to the radially outer side can be prevented.

Eighth Embodiment

Figure 15:
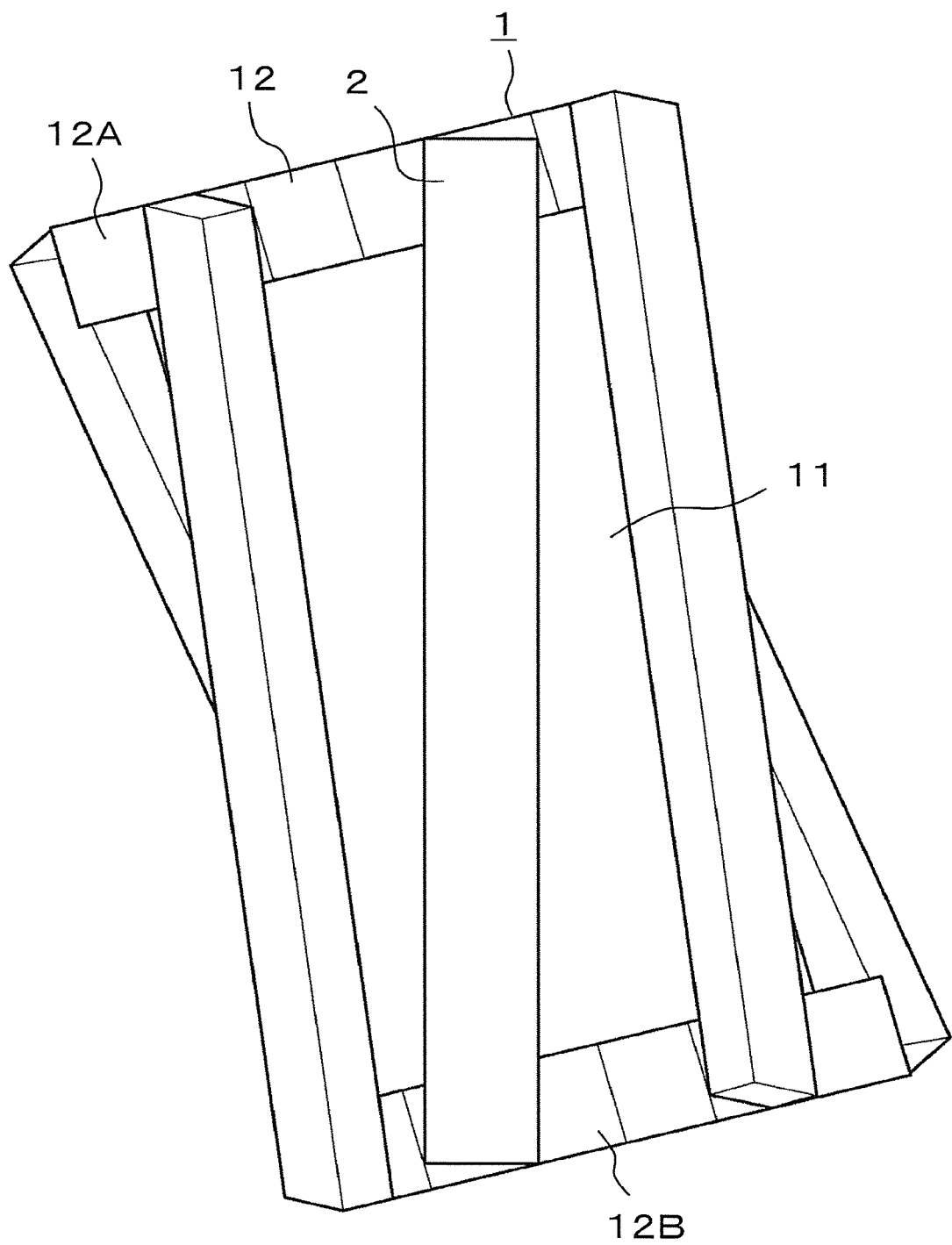
FIG. 15 is a side view for illustrating a rotor for a permanent magnet rotary electric machine according to an eighth embodiment of the present invention.

FIG. 15 is a side view for illustrating a rotor for a permanent magnet rotary electric machine according to an eighth embodiment of the present invention. A planar shape of the permanent magnet 2 as viewed from the radially outer side is a rectangular shape. Further, the permanent magnet 2 is extended such that a sectional shape perpendicular to a longitudinal direction is uniform over the longitudinal direction. In other words, the permanent magnet 2 is formed to have a cuboidal shape.

In the invention described in Patent Literature 2, a planar shape of the permanent magnet as viewed from the radially outer side is rhombic. For such a shape, the permanent magnet is required to be processed after being formed. Thus, manufacturing cost is increased. In contrast, in the eighth embodiment, the permanent magnet 2 is easily formed and can be manufactured at low cost. Further, when the planar shape of the permanent magnet is rhombic as described in Patent Literature 2, both ends of the permanent magnet 2 in the axial direction are large. Thus, leakage magnetic flux to the stator core increases to make the magnetic flux amount uneven in the axial direction, resulting in a fear of increase in cogging torque. In the eighth embodiment, the planar shape is the rectangular shape. Therefore, the leakage magnetic flux is less likely to be generated. Hence, the cogging torque can be reduced. The remaining configuration is the same as the configuration in the first embodiment.

As described above, according to the rotor for a permanent magnet rotating electric machine according to the eighth embodiment of the present invention, the permanent magnet 2 is formed to have the cuboidal shape, and therefore can be manufactured at low cost. Further, the cogging torque can be reduced. Although the shape of the permanent magnet 2 has been described as the cuboidal shape in the eighth embodiment, the permanent magnet 2 is only required to have a planar shape which is rectangular as viewed from a side surface as the shape of the permanent magnet 2. Therefore, a sectional shape perpendicular to the longitudinal direction may be a semi-cylindrical shape or a trapezoidal shape. With the above-mentioned shapes, the torque can be improved and the cogging torque can be reduced as in the first embodiment.

Ninth Embodiment

Figure 16:
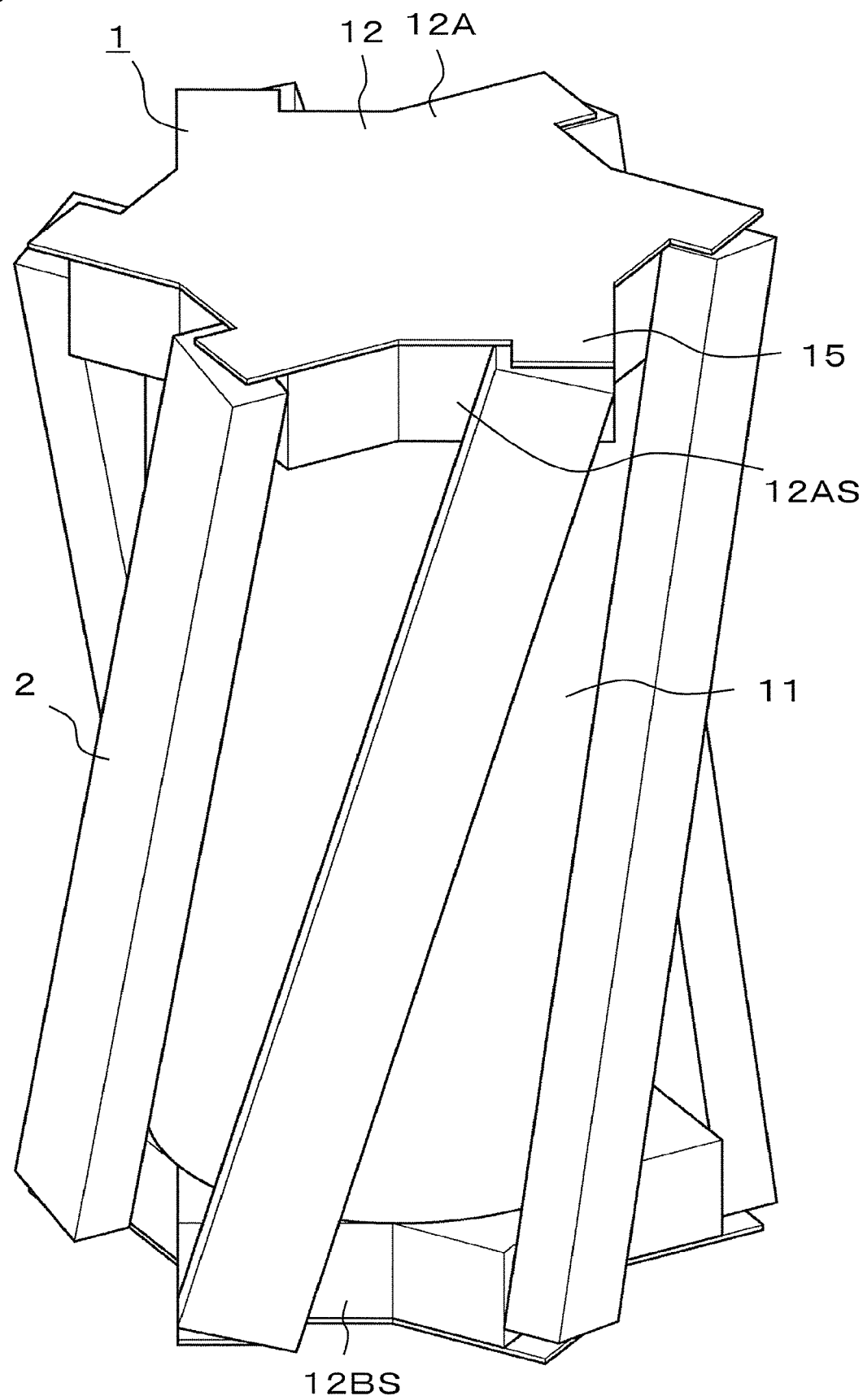
FIG. 16 is a perspective view for illustrating a rotor for a permanent magnet rotary electric machine according to a ninth embodiment of the present invention.
Figure 17:
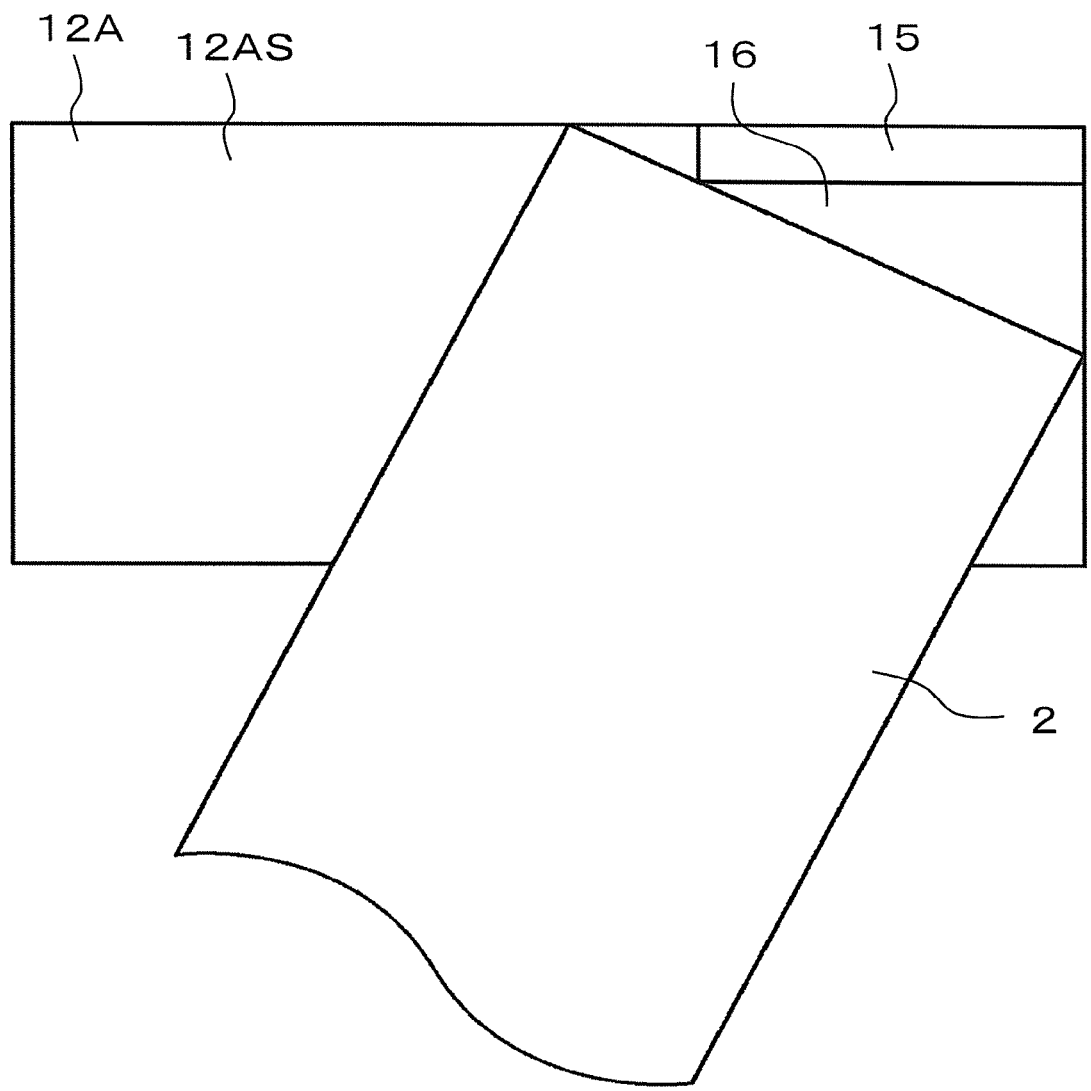
FIG. 17 is a side view for illustrating one end of the rotor for a permanent magnet rotary electric machine of FIG. 16 in an axial direction of the rotor.

FIG. 16 is a perspective view for illustrating a rotor for a permanent magnet rotary electric machine according to a ninth embodiment of the present invention, and FIG. 17 is a side view for illustrating one end of the rotor for a permanent magnet rotary electric machine of FIG. 16 in the axial direction. The rotor core 1 further includes projections 15 formed so as to be located on the axially outer side of the permanent magnets 2. The permanent magnet 2 has a cuboidal shape that is skewed with respect to the axial direction. Therefore, when at least two of four vertices of a side shape of the permanent magnet 2 are present in the same plane as a plane in which the polygonal columnar portion 12 of the rotor core 1 is present as viewed from a side surface, a clearance portion 16 is formed between the permanent magnet 2 and an end surface of the rotor core 1 in the axial direction for the flat surface 12AS of the rotor core 1, which retains the permanent magnet 2. The projection 15 is arranged in the clearance portion 16. Although not illustrated, the clearance portion 16 is also formed for the flat surface 12BS, and the projection 15 is arranged in the clearance portion 16. The projection 15 serves as an axial positioning portion provided on an outer side of the permanent magnet 2 in the longitudinal direction. The remaining configuration is the same as the configuration in the eighth embodiment.

The permanent magnets 2 are positioned in the axial direction with high accuracy by the projections 15, and hence the manufacturing variation can be reduced. Further, the permanent magnets 2 are positioned in the axial direction with high accuracy, and hence the effect of reducing the cogging torque owing to the skew can be effectively exerted.

For manufacture of the projections 15, each of the first polygonal columnar portion 12A and the second polygonal columnar portion 12B is formed of a laminate of thin sheets so that several thin sheets on each of both ends in the axial direction are thin sheets with projections and the other thin sheets are without projections. The above-mentioned structure is manufactured at low cost and therefore suitable.

As described above, according to the rotor for a permanent magnet rotary electric machine according to the ninth embodiment of the present invention, the rotor core 1 further includes the projections 15 formed so as to be located on the outer side of the permanent magnets 2 in the longitudinal direction. Therefore, the permanent magnets 2 can be positioned in the axial direction with high accuracy.

Tenth Embodiment

Figure 18:
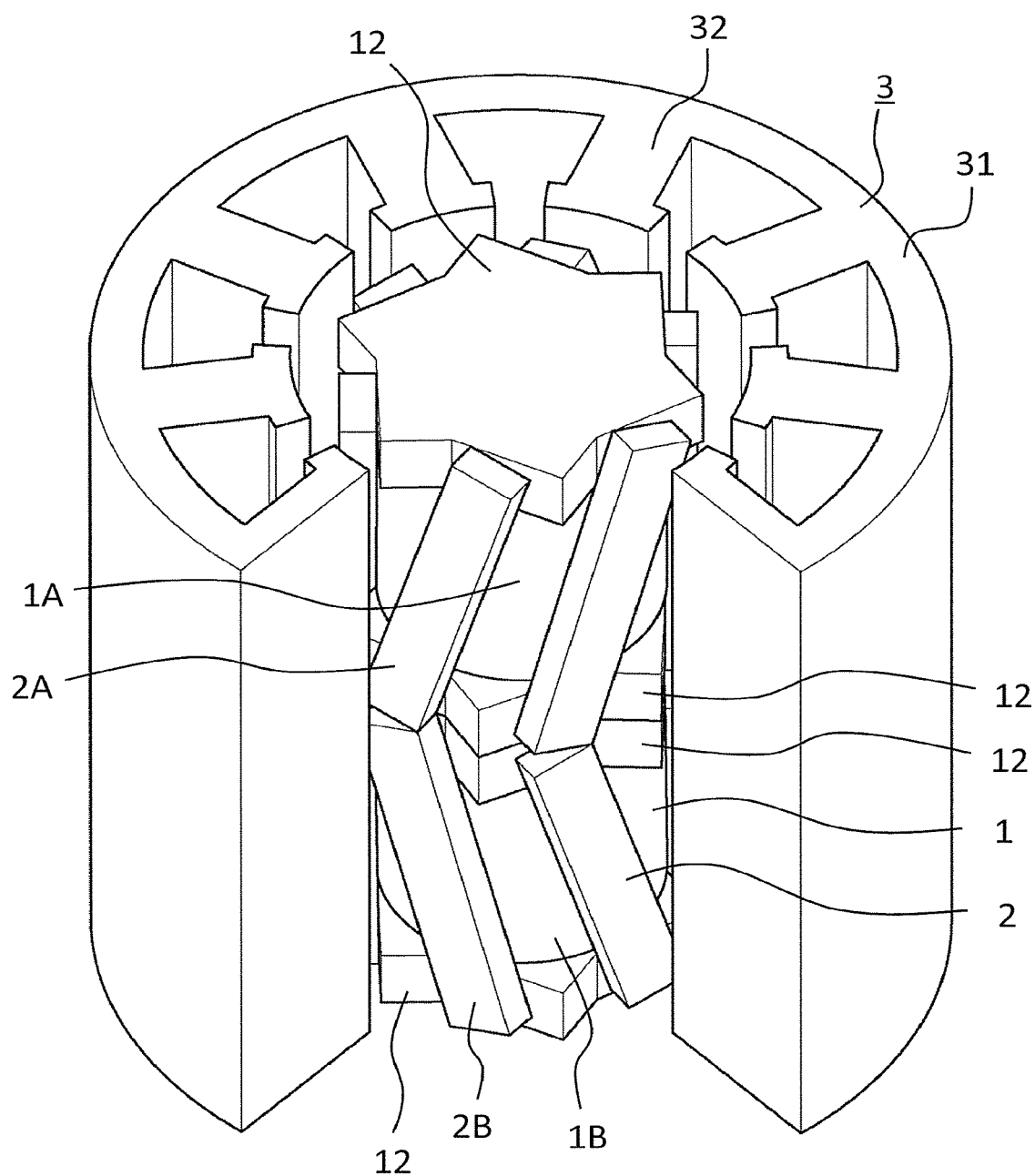
FIG. 18 is a perspective view for illustrating a rotor for a permanent magnet rotary electric machine according to a tenth embodiment of the present invention.

FIG. 18 is a perspective view for illustrating a permanent magnet rotary electric machine according to a tenth embodiment of the present invention. In FIG. 18, in order to illustrate a structure of a rotor, a stator core 3 is only partially illustrated. A rotor for the permanent magnet rotary electric machine according to the tenth embodiment of the present invention includes a plurality of the rotor cores 1 that are provided continuously in the axial direction and the plurality of permanent magnets 2 provided to the outer peripheral portion of each of the rotor cores 1. In this example, the rotor for the permanent magnet rotary electric machine includes a pair of the rotor cores 1. The pair of rotor cores 1 is stacked on each other in the axial direction.

In this example, one of the pair of rotor cores 1 stacked on each other in the axial direction is referred to as a first rotor core 1A and another one of the pair of rotor cores 1 is referred to as a second rotor core 1B. The plurality of permanent magnets 2 provided to an outer peripheral portion of the first rotor core 1A are referred to as first permanent magnets 2A, and the plurality of permanent magnets 2 provided to an outer peripheral portion of the second rotor core 1B are referred to as second permanent magnets 2B.

The first rotor core 1A and the second rotor core 1B are coupled to form a symmetric shape with respect to a plane perpendicular to the axial direction at ends that are held in contact with each other in the axial direction. In other words, the polygonal columnar portion 12 of the first rotor core 1A, which is located on the second rotor core 1B side, is arranged so as to overlap the polygonal columnar portion 12 of the second rotor core 1B, which is located on the first rotor core 1A side, as viewed in the axial direction. Further, the polygonal columnar portion 12 of the first rotor core 1A, which is located on the side opposite to the second rotor core 1B, is arranged so as to overlap the polygonal columnar portion 12 of the second rotor core 1B, which is located on the side opposite to the first rotor core 1A, as viewed in the axial direction.

The first permanent magnet 2A and the second permanent magnet 2B that are adjacent to each other in the axial direction are arranged to form a V-like pattern as viewed in the radial direction. In other words, the first permanent magnet 2A and the second permanent magnet 2B that are adjacent to each other in the axial direction are arranged to form a symmetric pattern with respect to surfaces perpendicular to the axial direction, at which the first rotor core 1A and the second rotor core 1B are held in contact with each other in the axial direction.

The stator core 3 is arranged around the first rotor core 1A, the first permanent magnets 2A, the second rotor core 1B, and the second permanent magnets 2B. The stator core 3 is formed to have a shape that is uniform in the axial direction. The first rotor core 1A, the first permanent magnets 2A, the second rotor core 1B, and the second permanent magnets 2B are arranged so as to be opposed to the stator core 3 in the radial direction via an air gap therebetween.

The stator includes the stator core 3 and a plurality of stator windings (not shown). The stator core 3 includes a core back 31 having an annular shape and a plurality of teeth 32 projecting radially inward from the core back 31. The plurality of stator windings are wound around the plurality of teeth 32 so as to be mounted therearound. The stator core 3 is made of a magnetic material. A current is supplied from an inverter (not shown) to the stator windings. By supplying the current to the stator windings, magnetic flux is generated in the air gap through the teeth. The remaining configuration is the same as the configuration in the first embodiment. The stator may be combined with each of the rotors of the first to ninth embodiments.

As described above, according to the rotor for a permanent magnet rotary electric machine according to the tenth embodiment of the present invention, an electromagnetic force in the axial direction generated between the first permanent magnets 2A and the stator core 3 and an electromagnetic force in the axial direction generated between the second permanent magnets 2B and the stator core 3 are canceled out. Therefore, not only the effect of reducing the cogging torque owing to the skew is obtained, but also vibration and noise generated by the electromagnetic forces in the axial direction can be reduced.

REFERENCE SIGNS LIST

1 rotor core, 1A first rotor core, 1B second rotor core, 2 permanent magnet, 2A first permanent magnet, 2B second permanent magnet, 3 stator core, 11 cylindrical portion, 12 polygonal columnar portion, 12A first polygonal columnar portion, 12B second polygonal columnar portion, 12C, 12D corner portion, 13 projection, 14 projection, 15 projection, 16 clearance portion, 31 core back, 32 tooth

The invention claimed is:

1. A rotor for a permanent magnet rotary electric machine, comprising:
    a rotor core including a cylindrical portion and a pair of polygonal columnar portions provided to both ends of the cylindrical portion in an axial direction of the rotor core; and
    a permanent magnet having a bonding surface, which is flat and to be bonded to the rotor core,
    wherein a first polygonal columnar portion which is one of the pair of polygonal columnar portions and a second polygonal columnar portion which is another one of the pair of polygonal columnar portions have flat surfaces,
    wherein a centroid in a circumferential direction of the cylindrical portion on the flat surface of the first polygonal columnar portion is spaced apart from a centroid in the circumferential direction on the flat surface of the second polygonal columnar portion in the circumferential direction, and
    wherein the bonding surface of the permanent magnet is bonded to the flat surface of the first polygonal columnar portion and the flat surface of the second polygonal columnar portion under a state in which the permanent magnet is skewed with respect to the axial direction.

2. A rotor for a permanent magnet rotary electric machine according to claim 1, wherein the flat surface of the first polygonal columnar portion and the flat surface of the second polygonal columnar portion, to which the bonding surface of the same permanent magnet is bonded, are arranged on the same plane.

3. A rotor for a permanent magnet rotary electric machine according to claim 2, wherein the one of the pair of polygonal columnar portions, as viewed in the axial direction, has a shape, which is asymmetric with respect to a center line thereof, and matches a shape of the another one of the pair of polygonal columnar portions as viewed in the axial direction when the shape of the one polygonal columnar portion is vertically inverted about the center line thereof.

4. A rotor for a permanent magnet rotary electric machine according to claim 3, wherein each of the pair of polygonal columnar portions, as viewed in the axial direction, has an outer shape of a polygonal shape having a number of vertices twice as many as a number of poles.

5. A rotor for a permanent magnet rotary electric machine according to claim 3, wherein the rotor core further includes a circumferential positioning portion formed on one side of the permanent magnet in the circumferential direction.

6. A rotor for a permanent magnet rotary electric machine according to claim 5, wherein the rotor core further includes a disengagement preventing portion, which is formed on the circumferential positioning portion and is arranged on a radially outer side of the permanent magnet.

7. A rotor for a permanent magnet rotary electric machine according to claim 1, wherein the permanent magnet is formed to have a rectangular side surface shape.

8. A rotor for a permanent magnet rotary electric machine according to claim 7, wherein the rotor core further includes an axial positioning portion, which is formed on an outer side of the permanent magnet in a longitudinal direction of the rotor core.

9. A rotor for a permanent magnet rotary electric machine according to claim 1,
- wherein a plurality of the rotor cores are provided continuously in the axial direction,
- wherein two of the rotor cores, which are adjacent to each other in the axial direction, are coupled so as to form a symmetric shape with respect to surfaces at ends of the two rotor cores, which are perpendicular to the axial direction and are held in contact with each other in the axial direction, and
- wherein the permanent magnets, which are respectively bonded to the two rotor cores coupled to each other, are arranged to form a V-like pattern as viewed in a radial direction of the rotor core.

10. A permanent magnet rotary electric machine, comprising:
- the rotor according to claim 1; and
- a stator including a stator core, which is arranged so as to be opposed to the rotor via an air gap therebetween.

* * * * *